United States Patent
Hayakawa

(10) Patent No.: US 8,705,108 B1
(45) Date of Patent: Apr. 22, 2014

(54) NON-TRANSITORY COMPUTER READABLE MEDIUM STORING PROGRAM FOR EXECUTING PRINT IMAGE PROCESSING SYSTEM

(71) Applicant: Fuji Xerox Co., Ltd., Tokyo (JP)

(72) Inventor: Michio Hayakawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/952,021

(22) Filed: Jul. 26, 2013

(30) Foreign Application Priority Data

Nov. 6, 2012 (JP) ................................ 2012-244744

(51) Int. Cl.
*G06F 3/12* (2006.01)
(52) U.S. Cl.
USPC ......... 358/1.15; 358/1.1; 358/1.13; 358/1.16; 358/1.17
(58) Field of Classification Search
USPC .................. 358/1.13–1.17, 1.1, 1.12; 347/19
See application file for complete search history.

(56) References Cited

U.S. PATENT DOCUMENTS

| | | | | |
|---|---|---|---|---|
| 5,269,013 | A * | 12/1993 | Abramson et al. | 711/170 |
| 5,333,246 | A * | 7/1994 | Nagasaka | 345/619 |
| 6,347,202 | B1 * | 2/2002 | Shishizuka et al. | 399/75 |
| 6,429,949 | B1 * | 8/2002 | Dziesietnik et al. | 358/1.16 |
| 7,120,773 | B2 * | 10/2006 | Yoshioka et al. | 711/165 |
| 7,460,285 | B2 * | 12/2008 | Yamazaki et al. | 358/534 |
| 8,503,019 | B2 * | 8/2013 | Miyazaki | 358/1.15 |
| 2004/0168028 | A1 * | 8/2004 | Cierniak | 711/125 |
| 2004/0174570 | A1 * | 9/2004 | Plunkett et al. | 358/3.13 |
| 2008/0172429 | A1 * | 7/2008 | Lin et al. | 707/205 |
| 2009/0153892 | A1 * | 6/2009 | Torii | 358/1.13 |
| 2010/0079798 | A1 | 4/2010 | Iguchi | |
| 2011/0075165 | A1 | 3/2011 | Hayakawa | |
| 2011/0267645 | A1 | 11/2011 | Miyazaki | |
| 2012/0013925 | A1 * | 1/2012 | Miyazaki | 358/1.13 |
| 2012/0133964 | A1 | 5/2012 | Hayakawa | |
| 2012/0133984 | A1 | 5/2012 | Hayakawa | |
| 2013/0077104 | A1 | 3/2013 | Nakamura | |

FOREIGN PATENT DOCUMENTS

| | | |
|---|---|---|
| JP | 10-097396 A | 4/1998 |
| JP | 2000-335022 A | 12/2000 |
| JP | 2010-088104 A | 4/2010 |
| JP | 2010-109967 A | 5/2010 |
| JP | 2011-025422 A | 2/2011 |
| JP | 2011-067993 A | 4/2011 |
| JP | 2011-070337 A | 4/2011 |
| JP | 2011-150535 A | 8/2011 |
| JP | 2011-230470 A | 11/2011 |
| JP | 4905604 B1 | 3/2012 |
| JP | 2012-116078 A | 6/2012 |
| JP | 2012-118738 A | 6/2012 |
| JP | 2012-118746 A | 6/2012 |

\* cited by examiner

*Primary Examiner* — Dennis Dicker

(74) *Attorney, Agent, or Firm* — Sughrue Mion, PLLC

(57) ABSTRACT

A non-transitory computer readable medium stores a program causing a computer to function as a determination unit and a controller. The determination unit determines an amount of hardware computational resources of the computer to determine the number of interpretation units capable of being implemented by the determined amount of hardware computational resources. The controller controls which of a first print data processing device and a second print data processing device the computer is caused to function as, in accordance with the number determined by the determination unit.

17 Claims, 26 Drawing Sheets

FIG. 17

| CACHE ID (HASH VALUE) | KEY DATA | CACHE LOCATION | ACCESS COUNT VALUE | REFERENCE COUNT VALUE |
|---|---|---|---|---|
| 0x0010 | FORM ID=1, LINE WIDTH=1, LINE CAP=round,.... | ADDRESS=0x04000000 SIZE=0x00000100 | 3 | 1 |
| 0x0340 | FORM ID=2, LINE WIDTH=0, LINE CAP=cut,.... | ADDRESS=0x04002000 SIZE=0x00000800 | 20 | 1 |
| 0x0530 | FORM ID=3, LINE WIDTH=0, LINE CAP=cut,.... | ADDRESS=0x00000000 SIZE=0x00000000 (NULL) | 1 | 0 |

FIG. 22

| CACHE ID (HASH VALUE) | KEY DATA | CACHE LOCATION | ACCESS COUNT VALUE | REFERENCE COUNT VALUE | RECENT ACCESS COUNT VALUE |
|---|---|---|---|---|---|
| 0x0010 | FORM ID=1, LINE WIDTH=1, LINE CAP=round,..... | ADDRESS=0x04000000 SIZE=0x00000100 | 123 | 0 | 0 |
| 0x0340 | FORM ID=2, LINE WIDTH=0, LINE CAP=cut,..... | ADDRESS=0x04002000 SIZE=0x00000800 | 130 | 1 | 21 |
| 0x0530 | FORM ID=3, LINE WIDTH=0, LINE CAP=cut,..... | ADDRESS=0x00000000 SIZE=0x00000000 (NULL) | 88 | 1 | 12 |

NON-TRANSITORY COMPUTER READABLE MEDIUM STORING PROGRAM FOR EXECUTING PRINT IMAGE PROCESSING SYSTEM

CROSS-REFERENCE TO RELATED APPLICATIONS

This application is based on and claims priority under 35 USC 119 from Japanese Patent Application No. 2012-244744 filed Nov. 6, 2012.

BACKGROUND (i) Technical Field

The present invention relates to a non-transitory computer readable medium storing a program for executing a print image processing system.

(ii) Related Art

In general, print document data sent from personal computers to printers are written in a page description language (PDL) such as PostScript (registered trademark) or Portable Data Format (PDF) (ISO 32000-1). In printers, print document data is converted into bitmap (also referred to as raster) image data by using data processing devices called raster image processors (RIPs), and the image data is printed by a print engine. In addition to printers of a type in which PDL data is converted directly into raster images, there are also available printers that perform two-step conversion in which PDL data is converted into intermediate language data having finer granularity than PDL commands, such as a display list, and the intermediate language data is buffered and is converted into a bitmap format.

In other systems of the related art, conversion of PDL data into bitmap or intermediate language image data is performed by multiple data processing devices in parallel in predetermined units such as pages.

In the related art, furthermore, a certain data processing device converts a PDL document element (object) in print data into a bitmap format or an intermediate language format, and caches the resulting data in a cache memory in association with information identifying the document element so that when the same data processing device or a different data processing device later converts the same document element, the data processing device may use the cached data to omit the conversion processing.

SUMMARY

According to an aspect of the invention, there is provided a non-transitory computer readable medium storing a program causing a computer to function as a determination unit and a controller. The determination unit determines an amount of hardware computational resources of the computer to determine the number of interpretation units capable of being implemented by the determined amount of hardware computational resources. The controller controls which of a first print data processing device and a second print data processing device the computer is caused to function as, in accordance with the number determined by the determination unit. The first print data processing device is a device configured to cause the computer to function as two or more first logical page interpretation units and one caching interpretation unit. The two or more first logical page interpretation units interpret different logical pages in print data in parallel, and output interpretation results. The caching interpretation unit interprets an element to be cached which is included in each logical page in the print data, and stores interpretation results in a cache unit. Upon detecting from the print data an element to be cached for which an interpretation result has not been stored in the cache unit, the caching interpretation unit interprets the detected element to be cached, and stores the interpretation result in the cache unit in association with cache identification information generated from data of the element to be cached in accordance with a predetermined generation rule. For an element to be cached which is included in a logical page being processed, each of the two or more first logical page interpretation units generates a cache reference command including cache identification information generated from data of the element to be cached in accordance with the generation rule, instead of interpreting the element to be cached, and incorporates the generated cache reference command in an interpretation result of the logical page as an interpretation result of the element to be cached. The second print data processing device is a device configured to cause the computer to function as a second logical page interpretation unit. The second logical page interpretation unit interprets each logical page of the print data, and outputs interpretation results. For an element to be cached in the logical page for which an interpretation result has not been stored in the cache unit, the second logical page interpretation unit interprets the element to be cached, and stores an interpretation result in the cache unit in association with cache identification information generated from data of the element to be cached in accordance with the generation rule. For an element to be cached in the logical page for which an interpretation result has been stored in the cache unit, the second logical page interpretation unit generates a cache reference command including cache identification information generated from data of the element to be cached in accordance with the generation rule, instead of interpreting the element to be cached, and incorporates the generated cache reference command in an interpretation result of the logical page as an interpretation result of the element to be cached. The first print data processing device and the second print data processing device supply the interpretation results of the respective logical pages of the print data, which are obtained by the first logical page interpretation units or the second logical page interpretation unit, to a print image data generation device. The print image data generation device is a device that processes the interpretation results of the respective logical pages, which are supplied from the first print data processing device or the second print data processing device, to generate print image data for the respective logical pages. Upon detecting the cache reference command in the interpretation results of the logical pages, the print image data generation device acquires an interpretation result corresponding to the cache identification information included in the cache reference command from the cache unit, generates print image data of an element to be cached corresponding to the cache identification information using the acquired interpreted interpretation result, and combines the print image data with the print image data of the logical pages.

BRIEF DESCRIPTION OF THE DRAWINGS

Exemplary embodiments of the present invention will be described in detail based on the following figures, wherein:

FIG. 17 illustrates an example of data content in a cache table;

FIG. 22 illustrates another example of the data content in the cache table;

DETAILED DESCRIPTION

Hardware Configuration of System

Figure 1:
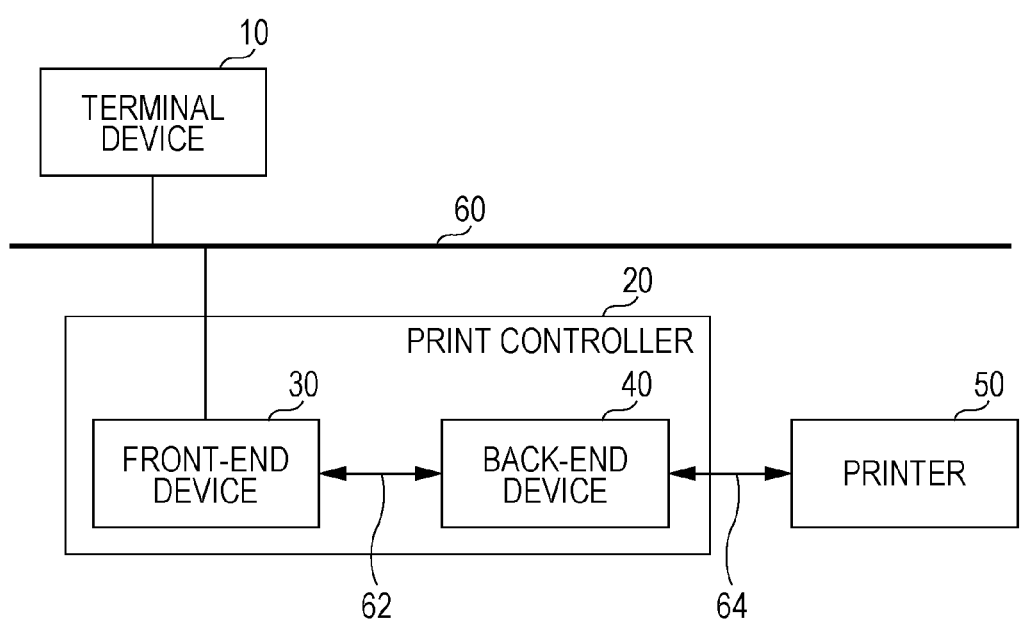
FIG. 1 is a block diagram illustrating an example of a configuration of an image processing system.

FIG. 1 is a block diagram illustrating an example of the configuration of an image processing system. Image processing systems according to examples of the following exemplary embodiments of the present invention may have a configuration illustrated by way of example in FIG. 1. The system in the example illustrated in FIG. 1 includes a terminal device 10, a print controller 20, and a printer 50. The print controller 20 includes a front-end device 30 and a back-end device 40. The terminal device 10 is connected to the front-end device 30 via a communication unit 60, and transmits a print job including a document print instruction to the front-end device 30 in accordance with a user instruction. The front-end device 30 is connected to the back-end device 40 via a communication unit 62, and the back-end device 40 is connected to the printer 50 via a communication unit 64.

The communication units 60, 62, and 64 may be networks such as local area networks (LANs). The communication units 60, 62, and 64 may be common communication units or different communication units. For example, the communication unit 60, which connects the terminal device 10 and the front-end device 30, may be a LAN, and the communication unit 62, which connects the front-end device 30 and the back-end device 40, and the communication unit 64, which connects the back-end device 40 and the printer 50, may be dedicated communication units different from a LAN.

In the system in the example illustrated in FIG. 1, a print job transmitted from the terminal device 10 is processed by the front-end device 30, and data obtained as a result of the processing is passed to the back-end device 40. The back-end device 40 generates rendering data (also referred to as "raster data"), and the printer 50 performs printing in accordance with the generated rendering data.

In the example illustrated in FIG. 1, the terminal device 10, the front-end device 30, and the back-end device 40 may be implemented by, for example, a general-purpose computer. The computer has a circuit configuration in which hardware components such as a central processing unit (CPU), a memory (primary memory), various input/output (I/O) interfaces, and a communication interface are connected via a bus. The computer exchanges data with other devices via the communication interface. An input device including a keyboard and a mouse, and a display such as a cathode ray tube (CRT) or a liquid crystal display are further connected to the bus via, for example, I/O interfaces. A disk drive for reading a hard disk drive (HDD) and portable non-volatile recording media compatible with various standards, such as a compact disc (CD), a digital versatile disc (DVD), and a flash memory, is further connected to the bus via an I/O interface. Such a drive functions as an external memory with respective to the memory. Programs describing the content of processes in the following exemplary embodiments are stored in a permanent memory such as the HDD via a recording medium such as a CD or a DVD or via a network, and are installed into the computer. The programs stored in the permanent memory are read into the memory and are executed by the CPU, thereby allowing the processes in the following exemplary embodiments to be implemented.

In examples of the following exemplary embodiments, some of the functions of the back-end device 40 may be implemented by hardware processing rather than software processing in response to the execution of a program. The hardware processing may be performed using, for example, a processor capable of dynamically reconfiguring a circuit during the execution of the processing, called a dynamic reconfigurable processor (DRP). Alternatively, the hardware processing may be performed using a circuit such as an application specific integrated circuit (ASIC). For example, a hardware element that executes some of the functions of the back-end device 40, such as a DRP or an ASIC, may be configured in advance, and may be connected to a bus of a general-purpose computer, thereby implementing the back-end device 40.

As a specific example of hardware implementing the front-end device 30 and the back-end device 40, a blade server in which multiple information processing devices each functioning as a server are housed in a single housing may be used. The blade server is a server device in which multiple substrates (or blades) each having mounted thereon a general-purpose computer including a CPU and a memory are housed in a housing. For example, one of the blades included in the blade server may function as the front-end device 30, and another blade may function as the back-end device 40. Alternatively, for example, each of the front-end device 30 and the back-end device 40 may be implemented by multiple blades included in the blade server.

The printer 50 is a device that performs printing on media such as sheets of paper, and may be, for example, a continuous-feed printer. Examples of the following exemplary embodiments will be described in the context of the printer 50 being a continuous-feed printer, by way of example. The printer 50 may be configured to perform electrophotographic printing, inkjet printing, or printing using any other type of print engine.

Exemplary Embodiment

Figure 2:
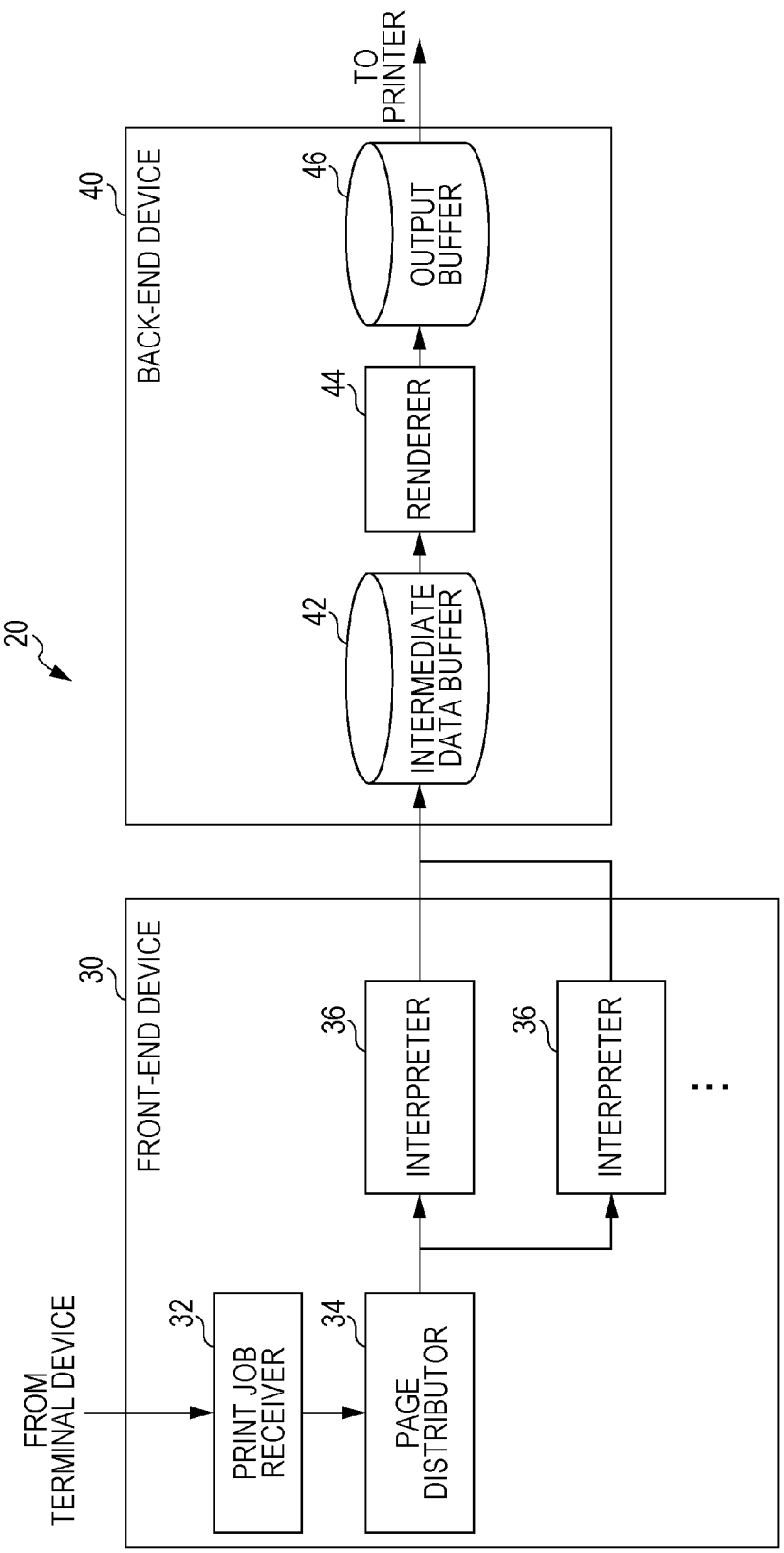
FIG. 2 is a block diagram illustrating an example of an internal configuration of a print controller.

FIG. 2 illustrates an example of a basic functional configuration of the front-end device 30 and the back-end device 40 of the print controller 20 according to an exemplary embodiment. The front-end device 30 includes a print job receiver 32, a page distributor 34, and multiple interpreters 36. The back-end device 40 includes an intermediate data buffer 42, a renderer 44, and an output buffer 46.

The print job receiver 32 of the front-end device 30 receives a print job from the terminal device 10. In the following examples, a print job includes an instruction to print a document, and data of the document to be printed, which is written in a page description language. A page description language (PDL) is a computer programming language for causing an information processing device to execute processes such as a displaying process and a printing process. Examples of the page description language include PostScript (registered trademark) and Portable Document Format (PDF). Data written in a page description language includes position information, format information, color information, and the like on objects included in a document to be printed, such as text, drawings, and images (bitmap images). In the following description, data of a document to be printed, which is written in a page description language, is referred to as "PDL data". The print job receiver 32 passes PDL data included in the received print job to the page distributor 34.

The page distributor 34 determines which of the pages included in the PDL data acquired from the print job receiver 32 is to be processed and by which of the interpreters 36 it is to be processed. The term "page", as used herein, denotes a page specified in PDL data, that is, a logical page. One or plural logical pages are printed on one side of a sheet, or on one physical page, in accordance with print settings. In the following description, as may be apparent from the context and unless otherwise stated, the term "page" refers to a logical page.

The page distributor 34 assigns a page to each of the interpreters 36 in accordance with the operation state of the interpreter 36. The page distributor 34 places a high priority on, for example, an interpreter 36 that is not executing processing or an interpreter 36 that is executing processing with a lower load than the other interpreters 36, and assigns pages to the interpreters 36 in order, starting from the first page in the PDL data. The page distributor 34 notifies each of the interpreters 36 of the assigned page, and also passes the PDL data acquired from the print job receiver 32 to the interpreters 36.

In the illustrated example, not only the assigned pages in the PDL data but also the entire PDL data is passed to the interpreters 36. In this example, for example, a page-dependent PDL (that is, a PDL of a type in which the generation of an image of a page depends on the results of interpretation of PDL data previous to the page) is used. In another example, a page-independent PDL (a PDL of a type in which only PDL data of an individual page is used for accurate generation of an image of the page) may be used. In this case, the page distributor 34 may assign a page of PDL data to each of the interpreters 36, and pass PDL data, which has been divided by page, to the corresponding interpreters 36 in accordance with the assignment.

Each of the interpreters 36 interprets the PDL data acquired from the page distributor 34, and generates and outputs, for the assigned page notified by the page distributor 34, intermediate data including instructions on the procedure for generating rendering data.

More specifically, each of the interpreters 36 interprets the PDL data, and generates intermediate data for the assigned page. The intermediate data is data obtained in a stage before the data is eventually converted into data to be output to the printer 50. Examples of the intermediate data include a display list and a section data format (see, for example, Japanese Unexamined Patent Application Publication No. 2011-150535 filed by the present applicant). Here, each of the interpreters 36 may generate intermediate data segmented for each of fundamental colors used in printing performed by the printer 50 (for example, four colors of yellow (Y), magenta (M), cyan (C), and black (K)). However, this is merely an example.

The intermediate data includes rendering instructions, for each of objects that are elements forming a document to be printed, on a procedure for rendering the object in a print image of the document. The rendering instructions may be written in a language that allows the representation of a more detailed procedure than a page description language. For example, if information indicating the position, shape, and size of a certain object in a print image is defined in a page description language, rendering instructions for the object in intermediate data may be instructions in which a procedure for rendering the object is written in units of scanning lines in the print image. The back-end device 40, described below, generates rendering data to be output to the printer 50 in accordance with the intermediate data.

Following are examples of commands used in the section data format (also referred to as the "run list" format).

(1) Line, ym, xl, xr, c

Perform rendering with gradation c from the x coordinate xl to the x coordinate xr-1 in the scanning line at the y coordinate ym.

(2) Duplicate

Perform rendering in the same manner (x coordinates, gradation) as that in the scanning line for the previous rendering.

(3) Window, xl, xr

Perform rendering from the x coordinate xl to the x coordinate xr-1 with the same gradation as that in the scanning line for the previous rendering.

Intermediate data of a certain page may be regarded as a set of instructions on a procedure for rending each of objects forming the page. The amount of intermediate data representing a page is smaller than the amount of raster data including the values of the pixels included in the page.

The section data format is merely an example of the intermediate data format. This exemplary embodiment may be applied to any intermediate data format to be used. In a case where a back-end device generates rendering data by performing hardware processing, any intermediate data format representing a rendering procedure that makes it possible to generate rendering data using hardware processing may be used, and a different format from the section data format given above by way of example may be used.

Intermediate data generated by each of the interpreters 36 is output to the back-end device 40. The output intermediate data is written in the intermediate data buffer 42 of the back-end device 40. The renderer 44 reads intermediate data of each of the pages stored in the intermediate data buffer 42, and generates rendering data (raster data) in accordance with the read intermediate data of the page. The generated rendering data of the respective pages is stored in the output buffer 46, and is sequentially read from the printer 50. The printer 50 prints the rendering data of the respective pages read from the output buffer 46 on a sheet of paper.

Next, an example of a configuration (referred to as a "first configuration") of the print controller 20 according to the exemplary embodiment will be described with reference to FIG. 3.

In the configuration illustrated by way of example in FIG. 2, the front-end device 30 includes multiple interpreters 36, and the multiple interpreters 36 execute in parallel a process for interpreting the assigned pages and generating intermediate data. In the first configuration illustrated in by way of example in FIG. 3, an interpretation system 35 in the front-end device 30 includes two logical page interpreters 36-*pa*1 and 36-*pa*2 (hereinafter collectively referred to as "logical page interpreters 36-*pa*" unless they are individually identified) each configured to generate intermediate data of a page (logical page), and a form interpreter 36-*f* configured to generate intermediate data for a form. The logical page interpreters 36-*pa*1 and 36-*pa*2 are similar to the interpreters 36 illustrated in FIG. 2. While the example illustrated in FIG. 3 uses two logical page interpreters 36-*pa*, more than two logical page interpreters 36-*pa* may be used.

The term "form" refers to an image that is expected to be repeatedly used over plural pages. A form includes one or more objects. In PDL data, a form is generally assigned identification information (referred to as a "form ID") uniquely identifying the form in the PDL data. If PDL data includes commands that specify the same form ID, the commands represent images that use the same form.

In the first configuration, a framework (a form cache 48) that caches and recycles intermediate data of a form that is generated may prevent inefficient generation of intermediate data such that intermediate data of the same form is generated a number of times. The form cache 48 is a cache for temporarily storing intermediate data of a form to be cached.

Each of the logical page interpreters 36-*pa*1 and 36-*pa*2 generates intermediate data of PDL data of a page assigned thereto by the page distributor 34. In an example, each of the logical page interpreters 36-*pa* processes a group of objects other than a form in the assigned page. For the form included in the page, intermediate data of a group of PDL commands (objects) forming the form is replaced by an intermediate data command for referring to identification information (referred to as a "cache ID") identifying intermediate data of the form, which is cached in the form cache 48. The intermediate data of the respective pages generated by the logical page interpreters 36-*pa* is sent to the intermediate data buffer 42 of the back-end device 40.

The form interpreter 36-*f* interprets a group of PDL commands of the form in the PDL data, and generates intermediate data representing the form. The form interpreter 36-*f* registers the generated intermediate data of the form in the form cache 48 of the back-end device 40. The form interpreter 36-*f* assigns a cache ID that is unique in at least the print job to the intermediate data representing the form to be registered in the form cache 48, and registers the intermediate data in the form cache 48 in association with the cache ID.

The logical page interpreters 36-*pa* process only the assigned pages in the PDL data of the print job (that is, interpret the pages and generate intermediate data), whereas the form interpreter 36-*f* processes all the pages in the PDL data of the print job. It is to be noted that the form interpreter 36-*f* processes only the form in the pages, and performs no processing on general objects that are not included in the form.

The logical page interpreters 36-*pa*1 and 36-*pa*2 and the form interpreter 36-*f* are typically implemented as processes executed on a CPU. For example, in a system configuration including a multi-core CPU, an individual core may be configured to execute a process of a single interpreter 36.

A cache management unit 38 holds management information for cache data (that is, intermediate data of a form) held in the form cache 48. The cache management unit 38 stores, for each piece of cache data, a cache ID and information (for example, the combination of the top address and the data size) indicating the storage location of the cache data in a memory space of the form cache 48. When processing a form in PDL data, the form interpreter 36-*f* refers to the cache management unit 38 and determines whether or not cache data of the form has been registered in the form cache 48. If the cache data of the form has been registered, the form interpreter 36-*f* does not generate cache data of the form. The form interpreter 36-*f* generates cache data of the form only when the cache data has not been registered.

Figure 9:
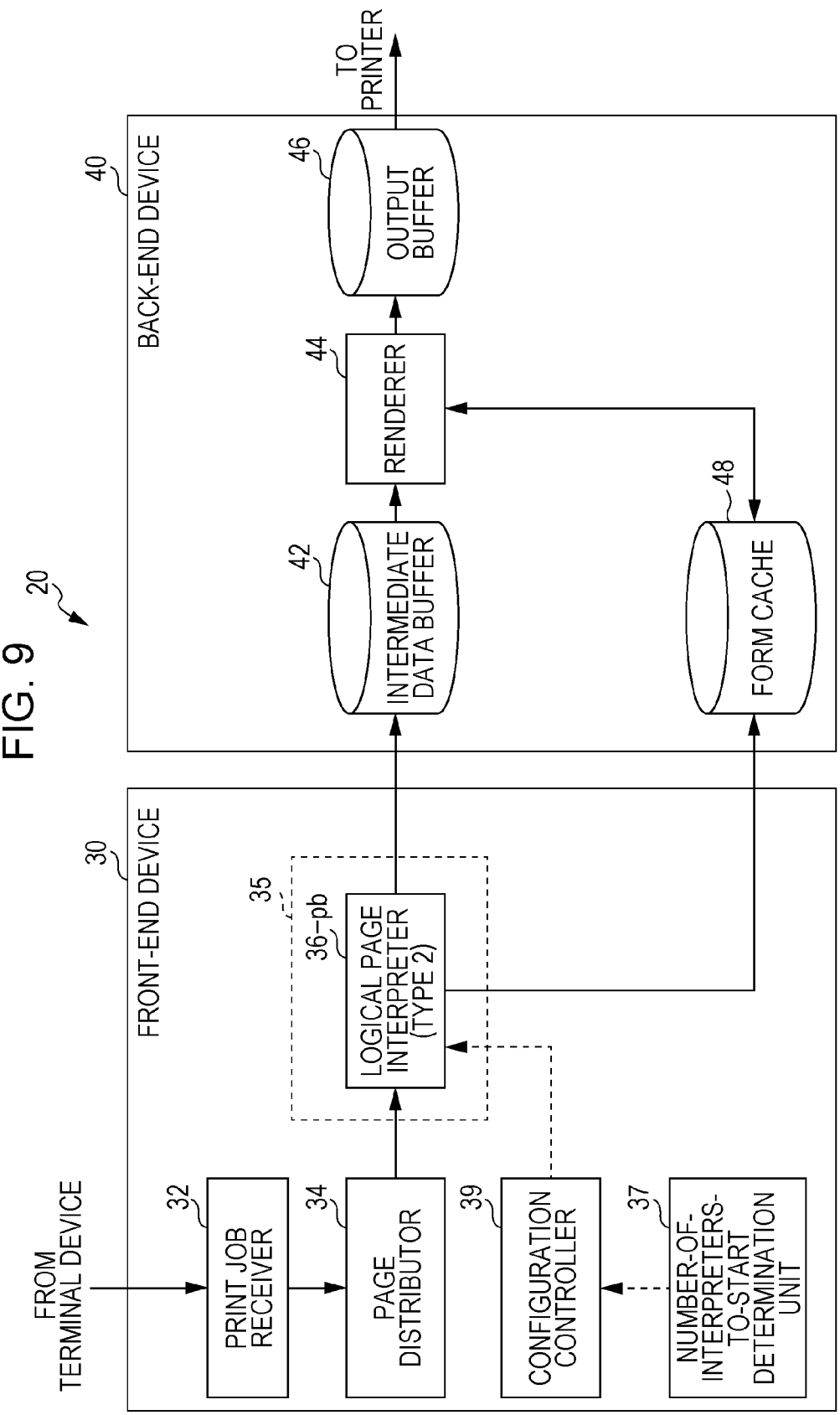
FIG. 9 is a block diagram illustrating a second configuration of a print controller according to the exemplary embodiment.

A number-of-interpreters-to-start determination unit 37 and a configuration controller 39 are function modules for controlling the functional configuration of the front-end device 30, particularly, the internal configuration of the interpretation system 35 that interprets print data. The number-of-interpreters-to-start determination unit 37 and the configuration controller 39 determine whether or not the interpretation system 35 including the three interpreters 36 (the two logical page interpreters 36-*pa* and the one form interpreter 36-*f*) illustrated in FIG. 3 is executable on a computer (for example, one or plural blades on a blade server) in which the front-end device 30 is incorporated. This determination is performed as, for example, part of the system configuration process for the startup of the front-end device 30 on the computer. The determination is based on the amount of hardware computational resources (for example, the memory capacity or the number of cores of the CPU) available for the number-of-interpreters-to-start determination unit 37 to use for the front-end device 30 on the computer. If it is determined that the interpretation system 35 is "executable", the configuration controller 39 starts the interpretation system 35 including the three interpreters 36. This is the "first configuration" of the front-end device 30 illustrated by way of example in FIG. 3. If it is determined that the interpretation system 35 is "not executable", the configuration controller 39 starts an interpretation system 35 including a single logical page interpreter 36-*pb* illustrated in FIG. 9 (the details of which will be described below) ("second configuration"). The processing procedures executed for the logical page interpreters 36-*pa* in the first configuration and the logical page interpreter 36-*pb* illustrated in FIG. 9 are different in part (the details of which will be described below). In the following description, the logical page interpreters 36-*pa* in the first configuration are of a type called "type 1", and the logical page interpreter 36-*pb* in the second configuration is of a type called "type 2" to distinguish them from each other.

Figure 3:
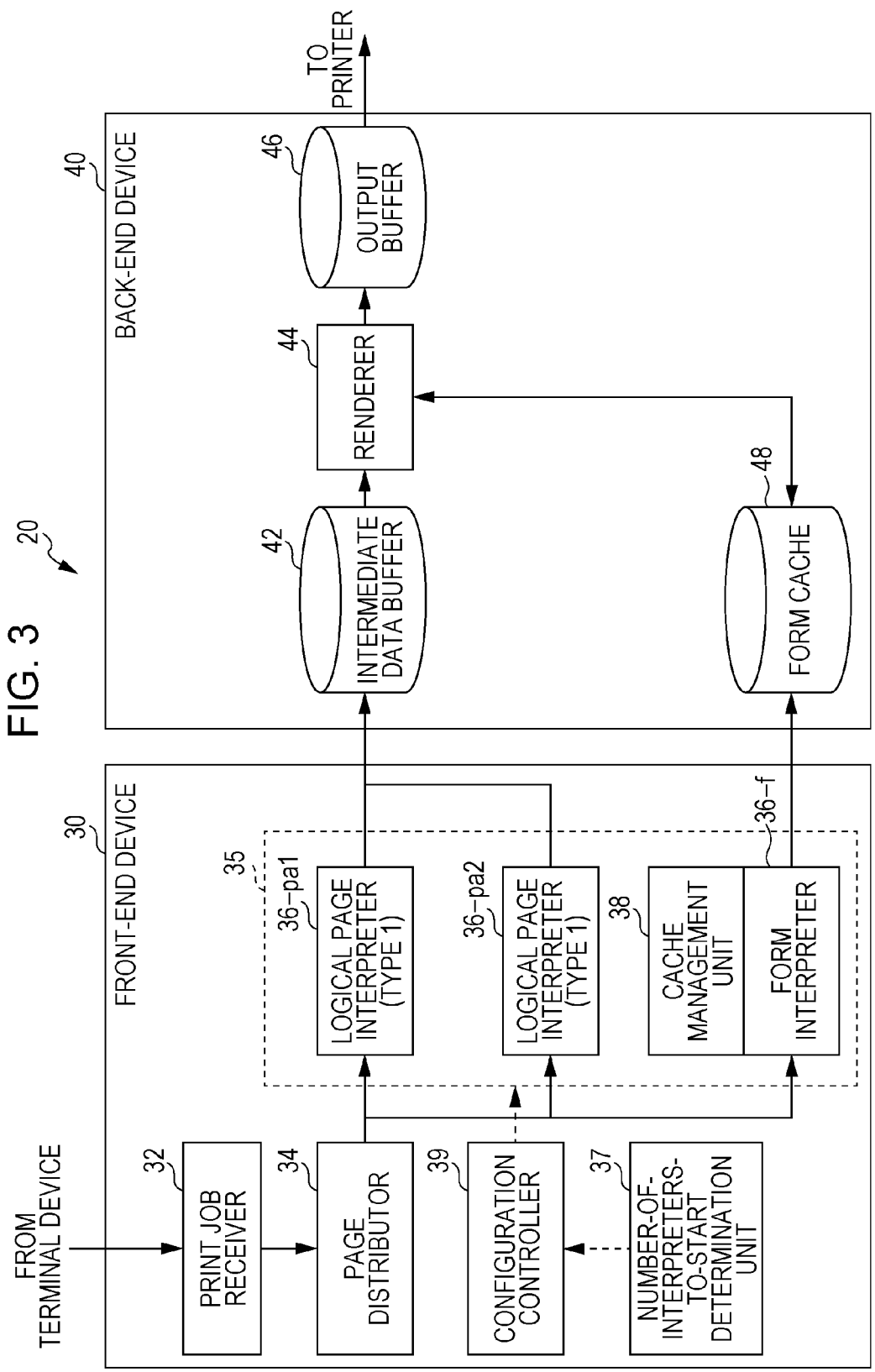
FIG. 3 is a block diagram illustrating a first configuration of a print controller according to an exemplary embodiment.

Still referring to FIG. 3, the renderer 44 of the back-end device 40 reads intermediate data of the respective pages stored in the intermediate data buffer 42 in, for example, page order, and generates rendering data in accordance with commands for the read intermediate data of the respective pages. If the read intermediate data of the respective pages includes a command for referring to a cache ID, the renderer 44 reads the intermediate data corresponding to the cache ID (that is, the intermediate data of a form) from the form cache 48, and processes the read intermediate data to generate rendering data of the form. The generated rendering data is combined with the rendering data of the pages.

In the foregoing description, any form is cached for simplicity of description. In an actual apparatus, however, all the forms are not necessarily cached. The use of a cache may cause processing overhead such as registration in the cache and a query regarding the presence or absence of necessary cache data. A form that is small or has a simple structure may require a short period of time for the generation of intermediate data. Taking such processing overhead into account, processing may be accelerated without using a cache. In the first configuration, therefore, only a form to be cached to provide high processing efficiency is cached. To this end, rules for determining a form to be cached to provide high processing efficiency (referred to as a "form to be cached") and an otherwise form are defined. Examples of the rules for determination are given below.

(Rule 1) If the number of pixels in the bounding box of a form is larger than a predetermined value (referred to as the "threshold number of pixels"), the form is determined to be a form to be cached, and otherwise the form is determined not to be a form to be cached. The bounding box of a form is a minimum rectangular volume that allows the form to be surrounded in a physical page.

(Rule 2) If the number of objects contained in a form is larger than a predetermined value (referred to as the "threshold number of objects"), the form is determined to be a form to be cached, and otherwise the form is determined not to be a form to be cached.

(Rule 3) If a form includes an image (bitmap) whose size is larger than a predetermined size (referred to as the "threshold image size"), the form is determined to be a form to be cached, and otherwise the form is determined not to be a form to be cached.

The determination may be performed using, for example, one of Rules 1 to 3 described above by way of example, or using two or more of them in combination. In a case where the determination is performed using two or more rules in combination, a form determined to be a form "to be cached" in accordance with at least one rule may be determined to be a form to be cached regardless of the results of determination in accordance with the other rules.

The threshold number of pixels, the threshold number of objects, and the threshold image size described above are values determined in accordance with the system configuration or performance of the front-end device 30 or the back-end device 40, and may be determined by experiment, simulation, or the like.

In the first configuration, the logical page interpreters 36-*pa*1 and 36-*pa*2 and the form interpreter 36-*f* determine whether or not a form is a form to be cached, by using a uniform common determination rule. Therefore, a form determined by, for example, the logical page interpreter 36-*pa*1 to be a form to be cached is also determined by the logical page interpreter 36-*pa*2 and the form interpreter 36-*f* to be a form to be cached.

In the first configuration, furthermore, the logical page interpreters 36-*pa*1 and 36-*pa*2 and the form interpreter 36-*f* assign a cache ID to cache data (intermediate data) of a form using a uniform common ID assignment rule. In the common ID assignment rule assignment rule, a cache ID to be assigned to cache data of a form is determined by taking into account various parameters defining the state of a finally rendered image of the form in addition to a form ID assigned to the form in the PDL data. Even when forms having the same form ID are used, difference in parameters with which the forms are to be rendered and printed results in finally different images of the forms appearing on printed matter. For this reason, pieces of cache data of forms having different parameters are handled as being different. Examples of parameters for rendering and the like which define cache IDs include a coordinate transformation matrix (a matrix representing the angle of rotation around coordinates and the ratio of scaling), rendering attribute information (for example, line width, line cap, line join, miter limit, line shape, stroke settings, rendering method, logical operation mode, and pattern information), clip information, and color information. In an example, the combination of a form ID and the parameters described above is represented as binary data, and a cache ID is generated from the generated binary data using a hash function such as MD5 hash function (defined in rfc 1321). A form ID and the parameters described above, which are used as materials of a cache ID, are referred to as "key data".

More exactly, the method described above may cause the cache IDs (hash values) of different pieces of cache data to have the same value due to the collision of hash functions. In order to avoid collision of hashes, the key data may be used as a cache ID.

Since key data is considerably long, a certain period of time may be required to match one piece of key data against another in order to determine whether or not there is available cache data. A considerable period of time may be taken to check one piece of key data against another for all the cache entries in the cache management unit 38. In the following example, therefore, the combination of key data and the hash value of the key data is used as a cache ID. In this example, the presence or absence of available cache data is determined by, first, narrowing down the cache entries for which one piece of key data is matched against another by hash value to reduce the number of cache entries.

Accordingly, in the first configuration, the logical page interpreters 36-*pa*1 and 36-*pa*2 and the form interpreter 36-*f* use a common ID assignment rule. Thus, for example, when the logical page interpreter 36-*pa*1 generates a certain cache ID for a certain form (where the logical page interpreter 36-*pa*1 does not generate intermediate data of the form), the form interpreter 36-*f* generates the same cache ID, and registers the intermediate data of the generated form in the form cache 48 in association with the cache ID.

Figure 4:
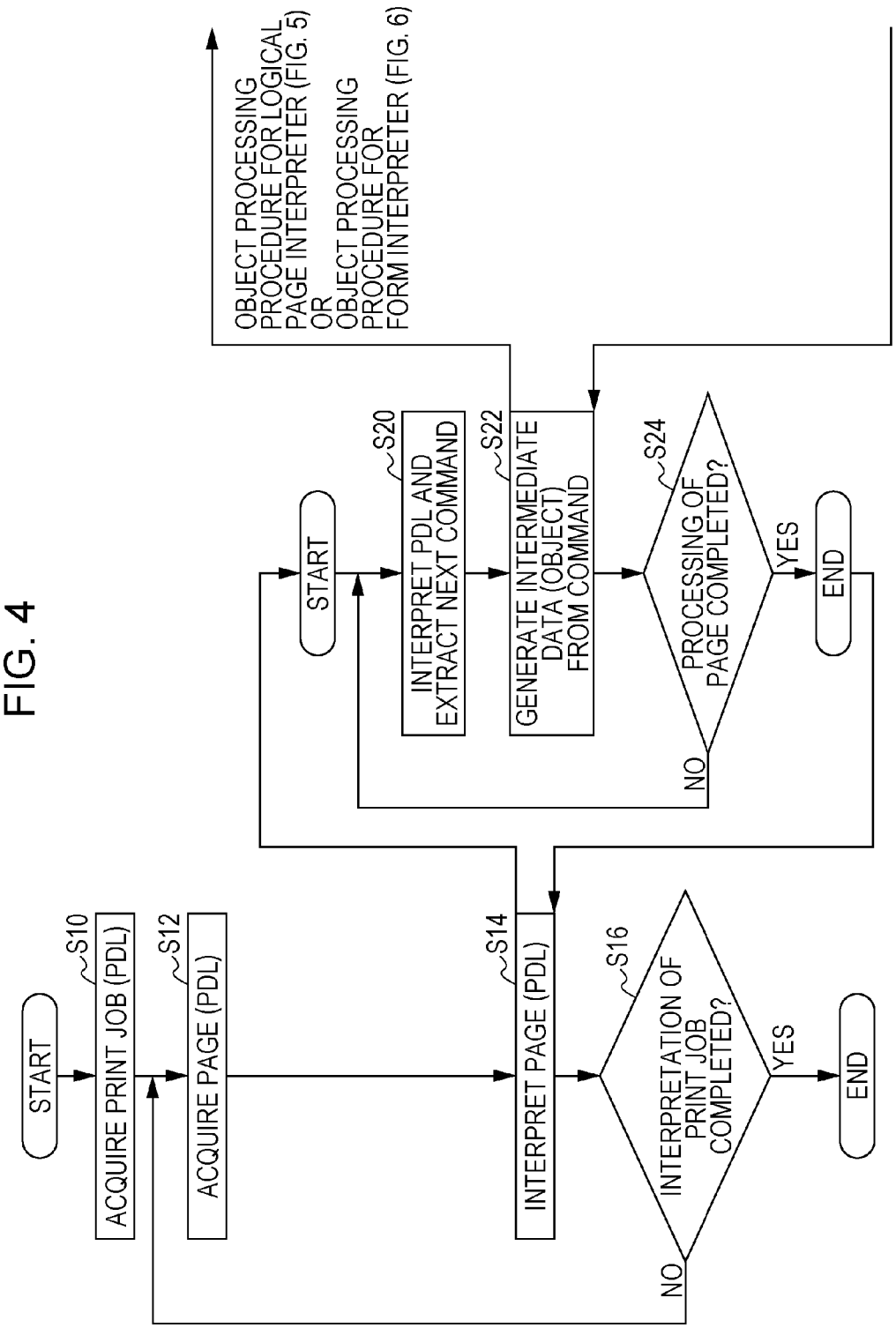
FIG. 4 illustrates an example of an overall processing procedure for a logical page interpreter and a form interpreter.
Figure 5:
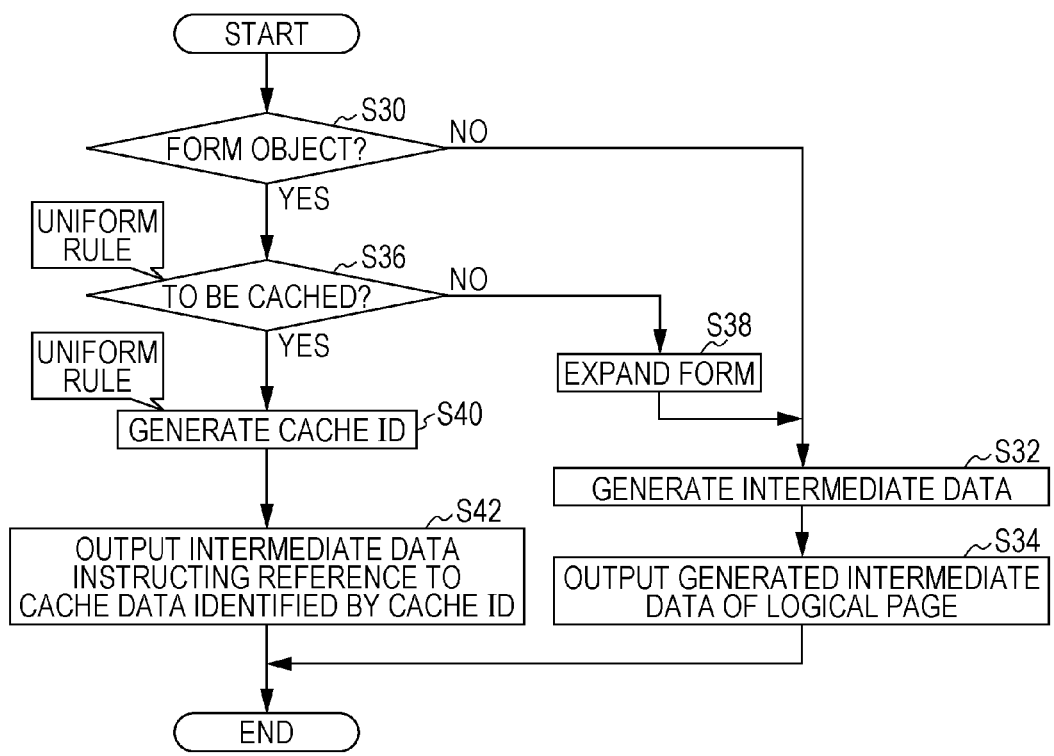
FIG. 5 illustrates an example of a command-by-command processing procedure for a logical page interpreter (type 1)
Figure 6:
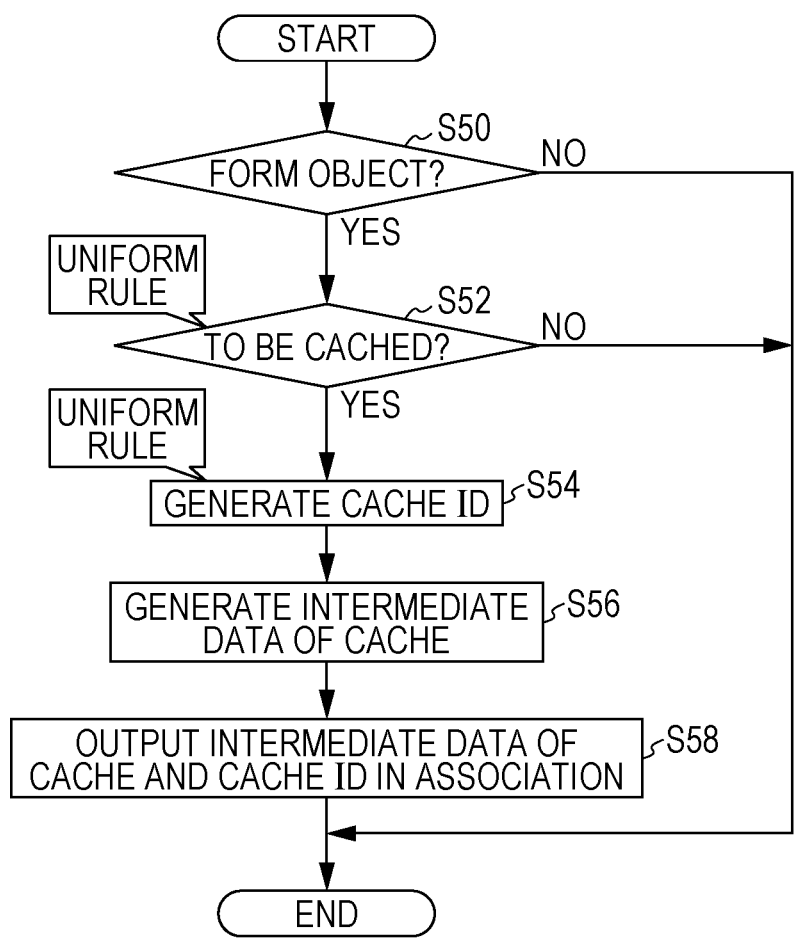
FIG. 6 illustrates an example of a command-by-command processing procedure for a form interpreter.

Next, referring to FIGS. 4 to 6, there is illustrated, by way of example, the procedure of processes executed by the logical page interpreters 36-*pa* (type 1) and the form interpreter 36-*f* in the first configuration.

FIG. 4 illustrates a processing procedure common to the logical page interpreters 36-*pa* (type 1) and the form interpreter 36-*f*. In the illustrated example, PDL data written in a page-dependent PDL is processed. In the following description, various types of logical page interpreters including the logical page interpreters 36-*pa* of type 1, and the form interpreter 36-*f* are collectively referred to as "interpreters 36", unless they are individually identified. In the first configuration, the interpreters 36 operate independently and asynchronously.

In the procedure illustrated in FIG. 4, each of the interpreters 36 acquires the overall PDL data of a print job from the print job receiver 32 (S10). Then, the interpreter 36 is assigned a page to be processed by the page distributor 34 (S12). Here, the page distributor 34 distributes some of the pages of the PDL data to each of the logical page interpreters 36-*pa*1 and 36-*pa*2, and distributes all the pages to the form interpreter 36-*f*. Each of the interpreters 36 interprets the PDL data of an assigned page (S14). Upon completion of the interpretation of the page, the interpreter 36 determines whether or not the interpretation of the overall print job has been completed (S16). If it is determined in that the interpretation has not completed, the interpreter 36 returns to S12, and notifies the page distributor 34 of completion of the interpretation of the current page, and is assigned the next page. The process described above is repeatedly performed until the interpretation of the overall print job has been completed.

In the page interpretation processing (S14), each of the interpreters 36 extracts commands of the PDL data one by one, starting from the beginning of the page (S20), and interprets an extracted command to generate an intermediate data object (S22). The processing of S20 and S22 is repeatedly performed until the processing of the last command of the page has been completed (S24).

In a case where page-dependent PDL data is to be processed, each of the logical page interpreters 36-*pa* interprets commands of all the pages regardless of whether or not each page is an assigned page, and causes the transition of the internal state thereof in accordance with the result of the interpretation. For an assigned page, each of the logical page interpreters 36-*pa* not only interprets the page but also generates intermediate data. This allows the generation of correct intermediate data that reflects the results of the interpretation from the top page. Similarly, the form interpreter 36-*f* interprets all the commands of PDL data including commands for rendering objects other than a form, and also generates intermediate data for a command for rendering the form.

The content of the intermediate data generation processing (S22) differs between the logical page interpreters 36-*pa* and the form interpreter 36-*f*.

FIG. 5 illustrates an example of the processing procedure of the intermediate data generation processing (S22) performed by each of the logical page interpreters 36-*pa* of type 1. In the illustrated example, each of the logical page interpreters 36-*pa* determines whether or not the command being processed (the command extracted in S20) is a command instructing the generation of a form object (S30). For example, in the case of PostScript (registered trademark), if the command being processed has the command name "form", the command is a command instructing the generation of a form object. A command instructing the generation of a form is accompanied by a form ID as a parameter.

If the determination result of S30 is negative (NO: a command other than a form generation command), the logical page interpreter 36-*pa* interprets the command to generate intermediate data (S32), and outputs the intermediate data as intermediate data of the page (S34).

If the determination result of S30 is positive (YES: a form generation command), the logical page interpreter 36-*pa* determines whether or not intermediate data of the form corresponding to the command is to be cached, in accordance with the uniform determination rule described above (S36).

If it is determined in S36 that the command is not to be cached (the determination result of S36 is negative (NO)), the logical page interpreter 36-*pa* extracts a form ID accompanying the command, acquires PDL data of the form corresponding to the form ID, and expands the PDL data onto a memory (S38). For example, only a form ID may be presented but PDL data representing the entity of the form may not be written in locations where the form is used the second and subsequent times in the PDL data. Even in such a case, the logical page interpreter 36-*pa* manages PDL data of the form that is read from the location where the form was used the first time in PDL data of the print job in association with the form ID. Thus, the managed PDL data is read and used for the place where the form is used the second and subsequent times. After expanding the PDL data of the form, the logical page interpreter 36-*pa* interprets the expanded PDL data to generate intermediate data (S32), and outputs the intermediate data (S34).

If it is determined in S36 that the command being determined is to be cached (the determination result of S36 is positive (YES)), the logical page interpreter 36-*pa* generates a cache ID corresponding to the command in accordance with the uniform ID assignment rule described above (S40). In S40, the logical page interpreter 36-*pa* extracts values of items included in key data using a group of parameters accompanying the command, such as the form ID, and information on the internal state of the logical page interpreter 36-*pa*, combines the extracted values to generate key data, and calculates the hash value of the key data. The hash value and the key data are formed as a pair which is used as a cache ID.

Then, the logical page interpreter 36-*pa* generates an intermediate data command instructing the reference to the cache data identified by the cache ID, and outputs the generated intermediate data command (S42). In this manner, for a cached form, each of the logical page interpreters 36-*pa* generates a cache data reference command instead of generating intermediate data representing the entity (image) of the form.

FIG. 6 illustrates an example of the processing procedure of the intermediate data generation processing (S22) performed by the form interpreter 36-*f*. In the illustrated example, the form interpreter 36-*f* determines whether or not the command being processed (the command extracted in S20) is a command instructing the generation of a form object, using a method similar to that in S30 (S50). If the determination result of S50 is negative (NO), the form interpreter 36-*f* terminates the process illustrated in FIG. 6 without performing any processing on the command.

If the determination result of S50 is positive (YES), the form interpreter 36-*f* determines whether or not intermediate data of the form corresponding to the command is to be cached next, in accordance with the uniform determination rule described above in a manner similar to that in S36 (S52).

If it is determined in S52 that the command is not to be cached (the determination result of S52 is negative (NO)), the form interpreter 36-*f* terminates the process illustrated in FIG. 6 without performing any processing on the command.

If it is determined in S52 that the command being determined is to be cached (the determination result of S52 is positive (YES)), the form interpreter 36-*f* generates a cache ID corresponding to the command using a method similar to that in S40 in accordance with the uniform ID assignment rule described above (S54). Then, the form interpreter 36-*f* interprets the command to generate cache data (intermediate data of the form) (S56), and outputs the generated cache data in association with the cache ID (S58). The output cache ID and cache data are formed as a pair which is registered in the form cache 48.

In S56 and S58, the generation and registration of the same cache data may be avoided for redundancy. To this end, the form interpreter 36-*f* may query the cache management unit 38 whether or not the cache data corresponding to the cache ID generated in S54 is present in the form cache 48 before cache data is generated, and may generate cache data only upon receipt of a response indicating that the cache data is not present. If cache data is generated and registered in the form cache 48, the form interpreter 36-*f* registers the cache ID of the cache data in the cache management unit 38 so that the cache data is recorded as having been registered.

Next, an example of the processing procedure for the renderer 44 of the back-end device 40 will be described with reference to FIGS. 7 and 8.

Figure 7:
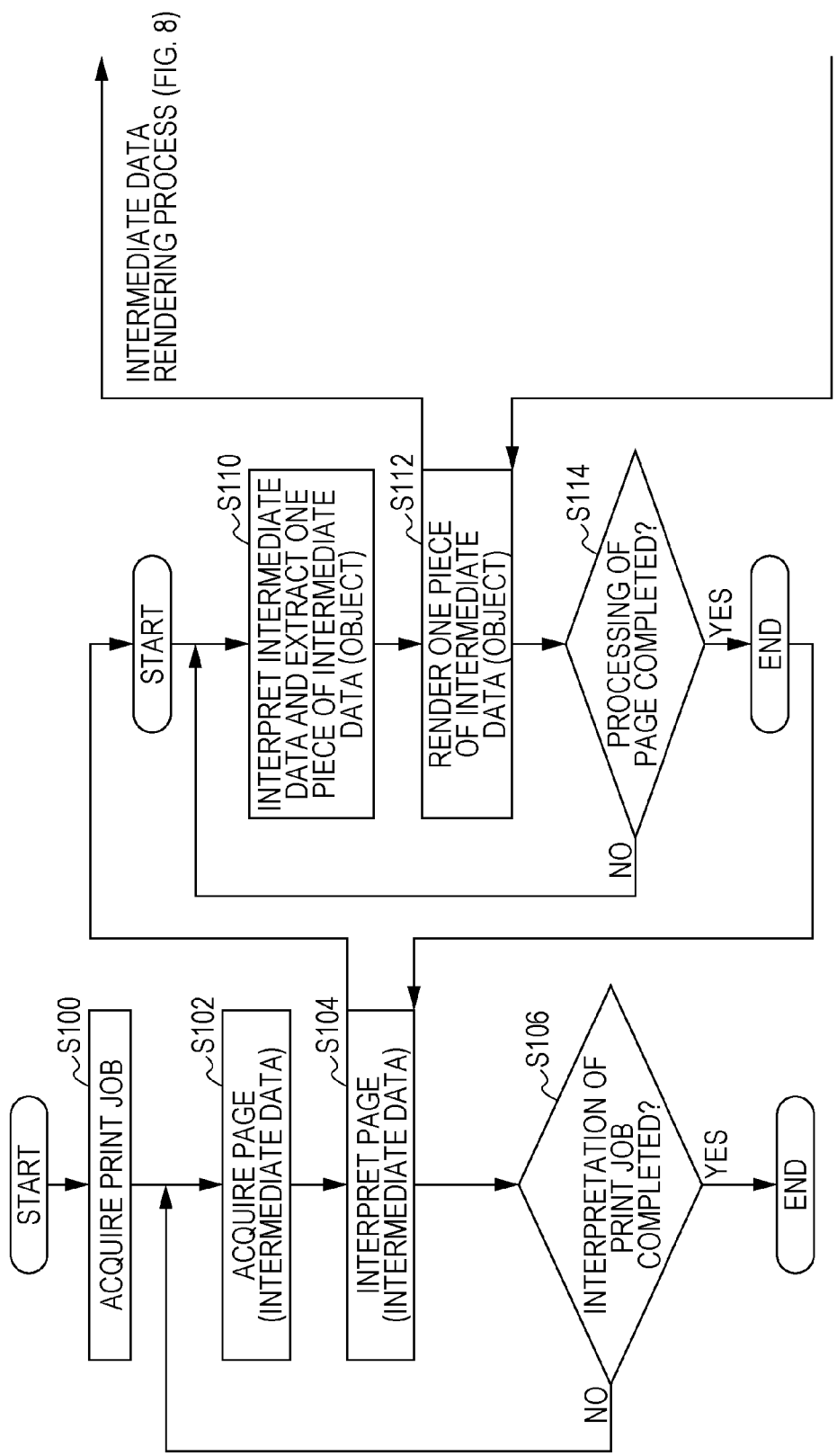
FIG. 7 illustrates an example of an overall processing procedure for a renderer.

As illustrated in FIG. 7, in the illustrated procedure, the renderer 44 first receives a specified print job to be processed (S100). Then, the renderer 44 acquires from the intermediate data buffer 42 intermediate data of pages one by one in order, starting from, for example, the top page of the print job (S102), and interprets the acquired intermediate data of the pages (S104). The processing of S102 and S104 is repeatedly executed on a page-by-page basis until the end of the print job (S106).

In the processing of interpreting intermediate data of a page (S104), the renderer 44 extracts commands of the intermediate data one by one, starting from the beginning of the page (S110), and interprets each of the extracted commands to render a raster image indicated by the command on a memory (S112). The processing of S110 and S112 is repeatedly performed until the processing of the last intermediate data command of the page has been completed (S114).

Figure 8:
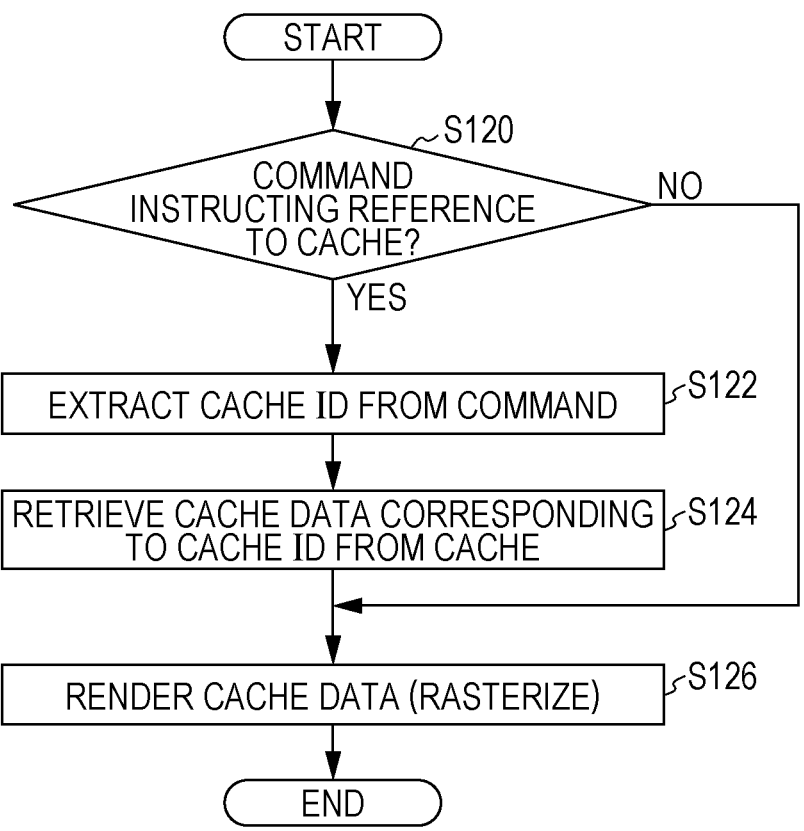
FIG. 8 illustrates an example of the procedure of a command-by-command rendering process for the renderer.

In the processing of interpreting intermediate data of a page (S112), as illustrated in FIG. 8, the renderer 44 reads commands of the intermediate data of the page in order, starting from the beginning of the page, and determines whether or not a read command is a command instructing the reference to cache data (referred to as a "cache reference command") (S120).

If the determination result of S120 is positive (YES), the renderer 44 extracts a cache ID from the cache reference command (S122), and retrieves the cache data (intermediate data) corresponding to the cache ID from the form cache 48 (S124). Then, the renderer 44 interprets the retrieved cache data to render a raster image (or "perform rasterization") (S126).

If the determination result of S120 is negative (NO), the renderer 44 interprets the command to perform rasterization (S126).

The foregoing description has been given of an example of the print controller 20 including the front-end device 30 having the first configuration. As described above, in the first configuration, the logical page interpreters 36-*pa* and the form interpreter 36-*f* use a uniform ID assignment rule, and assign a cache ID from the same material (that is, a form ID and other parameters defining an image obtained as a result of printing of the form). Hence, the interpreters 36 are capable of assigning the same cache ID to the same cache data without performing mutual communication. Accordingly, cache data identified by cache IDs of cache reference commands included in intermediate data of pages generated by the logical page interpreters 36-*pa*1 and 36-*pa*2 is necessarily generated by the form interpreter 36-*f* sooner or later, and is registered in the form cache 48 in association with the same cache ID. At the time when the renderer 44 is to process a cache reference command in a page, even if the cache data specified by the command is not present in the form cache 48, the renderer 44 is allowed to acquire the cache data from the form cache 48 after waiting for a while. Since the progress of the generation of cache data of a form by the form interpreter 36-*f* is not sufficient for a period during which the initial portion of the print job is processed, it is probable to some extent that the renderer 44 waits (waits for the generation of cache data to be completed). Whereas logical pages are processed in parallel by the multiple logical page interpreters 36-*pa*, forms are processed by the single form interpreter 36-*f* in page order. For this reason, it may be difficult for the processing of forms to catch up with the progress of the processing of logical pages. However, since the form interpreter 36-*f* generates cache data only once even though a number of forms having the same key data appear, the frequency with which new cache data needs to be generated is generally low at the time when a considerable number of pieces of cache data are accumulated in the form cache 48 with the advancement of processing to some extent. As a result, the page processing speed may increase, and the processing of forms may overtake the progress of the parallel processing of the logical page interpreters 36-*pa*. This may prevent the renderer 44 from waiting for the generation of cache data to be completed, as described above.

As described above, the first configuration allows intermediate data of a form to be cached and recycled even if the logical page interpreters 36-*pa*1 and 36-*pa*2 and the form interpreter 36-*f* operate independently and asynchronously without performing interprocess communication. Because of no overhead for interprocess communication, this exemplary embodiment may provide higher speed processing than that for a system in which interprocess communication is performed.

The front-end device 30 having the first configuration described above is provided with a form-dedicated interpreter (e.g., the form interpreter 36-*f*), which prevents each of the logical page interpreters 36-*pa* from substantially interpreting forms, resulting in high-speed operation being expected. Particularly, the larger the number of logical page interpreters 36-*pa* to perform parallel operations, the more effective it is to provide the form interpreter 36-*f* dedicated to interpretation of forms.

A converse viewpoint would be that the first configuration in which the multiple interpreters 36 operate in parallel may require a computer that the front-end device 30 is based on to have sufficient hardware computational resources (such as sufficient memory capacity and a sufficient number of processors). Installation of the front-end device 30 on a computer having a few hardware computational resources may provide lower processing speed than that in a configuration in which operations are not performed in parallel, or may prevent such parallel processing from being executed. For example, in a case where the interpreters 36 are implemented in a time-division manner on a single CPU, overhead required for switching between the interpreters 36 to be implemented may reduce the processing speed. In addition, while each of the interpreters 36 may require a sufficient memory space to process data of one page, it may be difficult for a computer having a small memory capacity to reserve a memory space required for the multiple interpreters 36. It may be difficult for such a computer to implement the front-end device 30 having the first configuration.

In a case where a program for causing a computer to function as the front-end device 30 is created, it is desirable that the program be flexible to support the performance (hardware computational resources) of the computer to which the program is to be installed. In this exemplary embodiment, therefore, the program for the front-end device 30 includes a description for implementing, in addition to the first configuration described above, the second configuration to address the case where the computer to which the program is to be installed has no sufficient hardware computational resources to enjoy the merits of parallel processing with the first configuration.

The second configuration will be described with reference to FIG. 9. In the second configuration illustrated in FIG. 9, unlike the first configuration illustrated in FIG. 3, the interpretation system 35 includes a single logical page interpreter 36-*pb* (type 2). The logical page interpreter 36-*pb* of type 2 is configured to execute both a process for creating intermediate data of logical pages and a process for registering intermediate data of forms to be cached that are included in the logical pages in the form cache 48. The configuration other than the interpretation system 35 illustrated in FIG. 9 is similar to that of FIG. 3.

Figure 10:
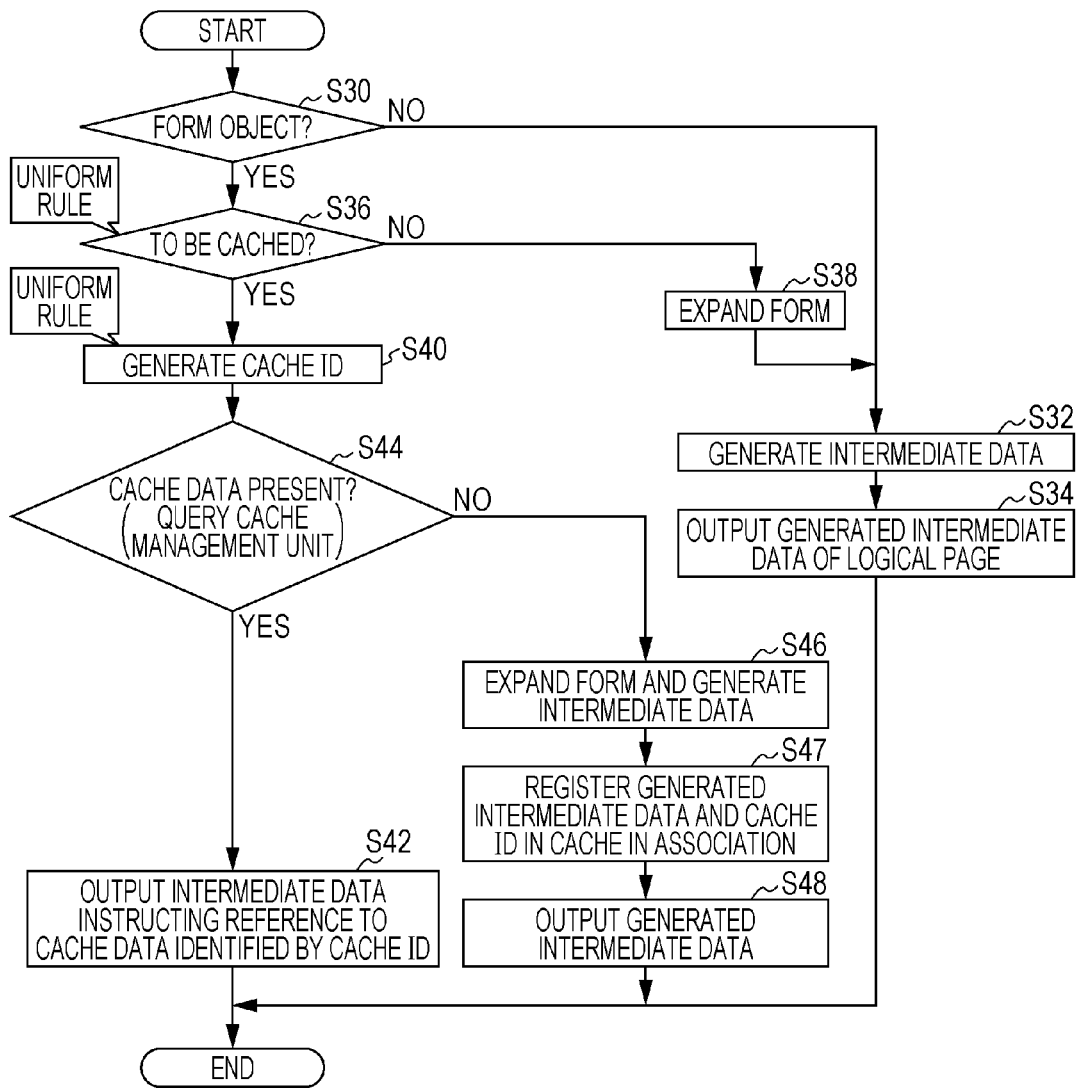
FIG. 10 illustrates an example of a command-by-command processing procedure for a logical page interpreter (type 2)

FIG. 10 illustrates an example of the procedure of an interpretation process executed by the logical page interpreter 36-*pb* (type 2). In the procedure illustrated in FIG. 10, steps similar to the steps in the procedure for each of the logical page interpreters 36-*pa* (type 1) illustrated in FIG. 5 are assigned the same numerals, and a detailed description thereof is omitted.

In the procedure illustrated in FIG. 10, when processing a form to be cached, if the logical page interpreter 36-*pb* determines in S36 that the form being determined is to be cached (the determination result of S36 is positive (YES)), the logical page interpreter 36-*pb* generates a cache ID corresponding to the command (S40). The cache ID may be generated in accordance with, for example, the uniform ID assignment rule, which is substantially the same as that in the first configuration. Then, the logical page interpreter 36-*pb* queries the cache management unit 38 whether or not the cache data corresponding to the cache ID generated in S40 is present in the form cache 48 (S44). If a response indicating "non-presence" is received from the cache management unit 38 in response to the query (the determination result of S44 is negative (NO)), the logical page interpreter 36-*pb* expands and interprets the PDL data of the form to generate intermediate data of the form (S46), and registers the generated intermediate data in the form cache 48 in association with the cache ID generated in S40 (S47). Then, the interpreter 36 outputs the intermediate data of the form generated in S46 to the intermediate data buffer 42 as part of the interpretation results of the logical pages (S48). If a response indicating "presence" is received from the cache management unit 38 in S44, the logical page interpreter 36-*pb* generates an intermediate data command instructing the reference to the cache data identified by the cache ID, and outputs the generated intermediate data command to the intermediate data buffer 42 as part of the interpretation results of the logical pages (S42).

After the processing of S47, the processing of S42 may be executed in place of the processing of S48.

For example, if the available capacity of the form cache 48 is smaller than the size of the intermediate data of the form to be newly registered by the logical page interpreter 36-*pb*, the cache management unit 38 deletes cache data that is not frequently used in the form cache 48 to increase the available capacity, and then registers the intermediate data of the form.

The operation of the renderer 44 in the configuration illustrated in FIG. 9 is substantially the same as the operation of the renderer 44 in the first configuration (FIG. 3).

In the second configuration illustrated in FIG. 9, a single interpreter 36 (that is, the logical page interpreter 36-*pb*) is used. Thus, the second configuration may be appropriately implemented on a computer even when the performance of the computer is not suitable for parallel processing.

Figure 11:
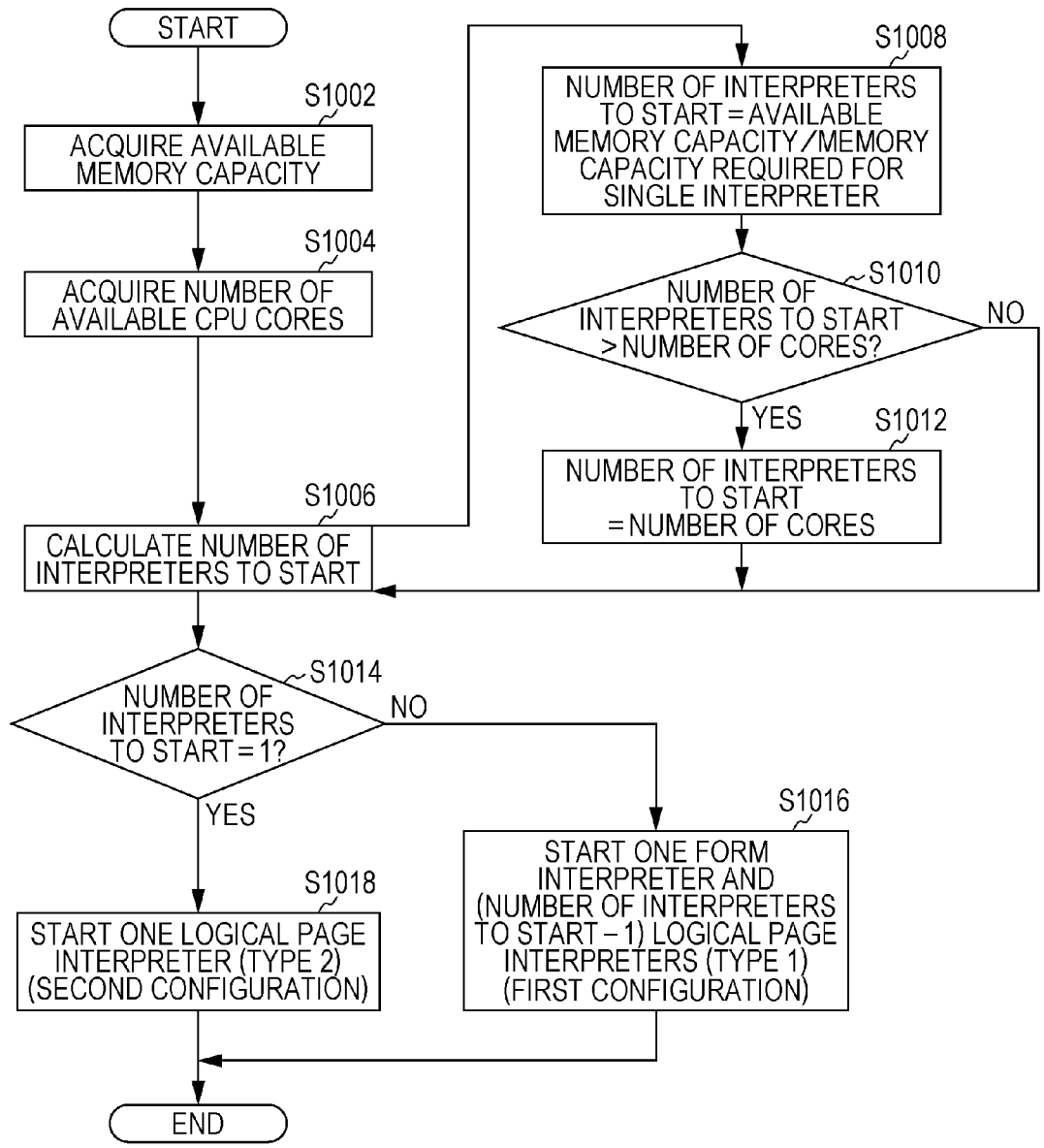
FIG. 11 illustrates an example of a processing procedure of a configuration process for an interpretation system according to the exemplary embodiment.

As described above, in the print controller 20 according to this exemplary embodiment, the number-of-interpreters-to-start determination unit 37 and the configuration controller 39 switch the configuration of the front-end device 30 between the first configuration and the second configuration in accordance with the hardware computational resources of the computer to which the program is to be installed. FIG. 11 illustrates an example of the procedure for switching control.

The procedure illustrated in FIG. 11 is typically executed in the system configuration process for the startup of the front-end device 30 on a computer. In the illustrated procedure, first, the number-of-interpreters-to-start determination unit 37 acquires information on hardware computational resources (in the illustrated example, the memory capacity and the number of cores of the CPU), which may be assigned to the interpretation system 35, from an operating system (OS) or the like of the computer (S1002, S1004). If a program for the functions other than the functions of the front-end device 30, which are implemented on the computer, is executed, the memory capacity and the number of cores acquired in S1002 and S1004 are smaller than the capacity of the memory included in the computer and the number of cores of the CPU included in the computer, respectively. The number-of-interpreters-to-start determination unit 37 calculates the number of interpreters 36 that are capable of being started on the computer (hereinafter referred to as "the number of interpreters to start") in accordance with the information acquired in S1002 and S1004 (S1006).

In the processing of S1006, first, the number-of-interpreters-to-start determination unit 37 divides the memory capacity determined in S1002 by the memory capacity required for the single interpreter 36 to perform processing (fractions are rounded off) to determine the provisional "number of interpreters to start" (S1008). The memory capacity required for the single interpreter 36 to perform processing is determined in advance. If a number of interpreters 36 exceeding the provisional number of interpreters to start are to be implemented on the computer, each individual interpreter 36 has a memory capacity smaller than the memory capacity required for the interpreter 36 to perform its processing, and therefore the interpreters 36 may not correctly operate.

Then, the number-of-interpreters-to-start determination unit 37 determines whether or not the provisional number of interpreters to start determined in S1008 is larger than the number of cores of the CPU acquired in S1004 (S1010). If the provisional number of interpreters to start is larger than the number of cores, the number of cores is set as the authorized number of interpreters to start (S1012). When a single CPU core is used to implement multiple interpreters 36, there is a problem with the loss of time caused by the switching between the interpreters 36 to be implemented, and therefore a number of interpreters 36 exceeding the number of cores are not started. If it is determined in S1010 that the provisional number of interpreters to start is less than or equal to the number of cores, the number-of-interpreters-to-start determination unit 37 skips the processing of S1012, and sets the provisional number of interpreters to start as the authorized number of interpreters to start. The number of interpreters to start determined in the manner described above is transferred to the configuration controller 39.

The configuration controller 39 determines whether or not the transferred number of interpreters to start is equal to 1 (S1014). If it is determined that the number of interpreters to start is greater than or equal to 2, the first configuration illustrated in FIG. 3 is employed, and one form interpreter 36-*f* and logical page interpreters 36-*pa*, the number of which is equal to "the number of interpreters to start minus 1", are started in the interpretation system 35 (S1016). In this case, the form interpreter 36-*f* and the logical page interpreters 36-*pa* are implemented by separate cores. If it is determined in S1014 that the number of interpreters to start is equal to 1, the second configuration illustrated in FIG. 9 is employed, and a single logical page interpreter 36-*pb* is started in the interpretation system 35 (S1018).

Accordingly, in a case where the procedure illustrated in FIG. 11 is executed in the system configuration process for the startup of the front-end device 30, the number-of-interpreters-to-start determination unit 37 and the configuration controller 39 may be implemented on the computer during the execution of the system configuration process, and may be deleted after the completion of the system configuration process.

After the startup of the front-end device 30, the amount of hardware computational resources assigned to the front-end device 30 may vary during operation (for example, in a case where the memory capacity assignable to the front-end device 30 may be reduced by executing another program having a higher priority). In order to address such a case, the number-of-interpreters-to-start determination unit 37 and the configuration controller 39 may be resident on the computer, and may be configured to periodically execute the process illustrated in FIG. 11 (the same applies to exemplary modifications described below).

First Exemplary Modification

In the exemplary embodiment described above, the second configuration (FIG. 9) is employed in a case where the number of interpreters 36 capable of being started by the hardware computational resources of the computer into which the front-end device 30 is incorporated is one, and the first configuration (FIG. 3) is employed in a case where the number of interpreters 36 capable of being started is more than one.

However, in the first configuration, the form interpreter 36-*f* dedicated to interpretation of forms may be less beneficial if the number of logical page interpreters 36-*pa* capable of being implemented in parallel is small. In an extreme example, in a configuration in which the number of interpreters to start is equal to two and one form interpreter 36-*f* and one logical page interpreter 36-*pa* are started, the processing of the former that processes only forms proceeds much faster than the processing of the latter, and the overall processing speed of the interpretation system 35 is limited by the speed of the logical page interpreter 36-*pa*. In this case, parallel execution of the interpretation of logical pages using two interpreters 36 may provide higher processing speed. In this manner, in order to make effective the first configuration including the form interpreter 36-*f* dedicated to interpretation of forms, it is desirable that more than a certain number of logical page interpreters 36-*pa* be implemented in parallel. The lower limit N of the number of logical page interpreters 36-*pa* operating in parallel which is required to make the first configuration effective is determined by experiment or the like.

In a first exemplary modification, therefore, if the number of interpreters to start determined using the hardware computational resources of the computer (S1006 in FIG. 11) is in the range of not less than two and not greater than the lower limit N of the number of logical page interpreters 36-*pa* operating in parallel to make the first configuration effective, a third configuration different from the first and second configurations described above is used.

Figure 12:
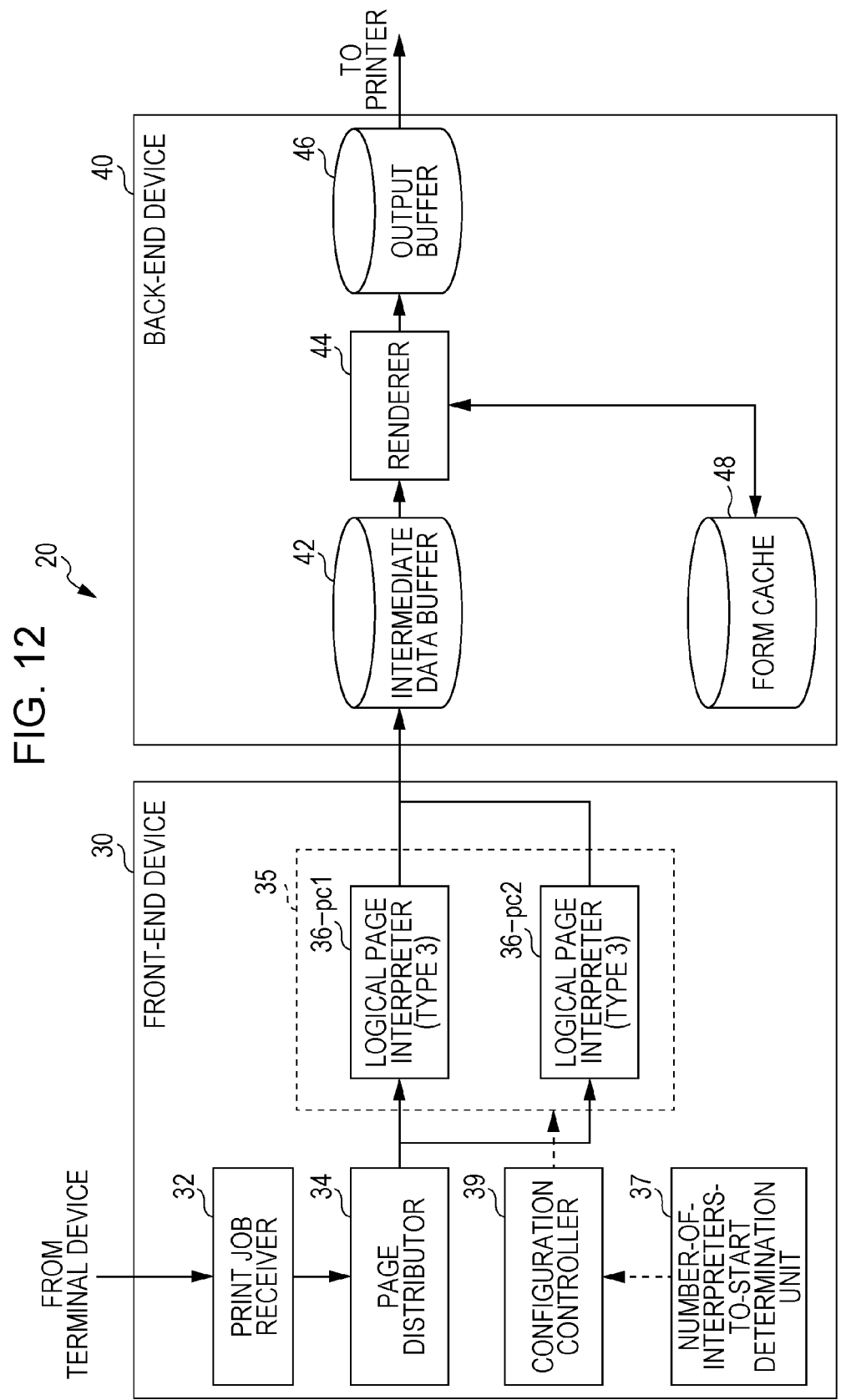
FIG. 12 is a block diagram illustrating a third configuration of a print controller according to a first exemplary modification.

FIG. 12 illustrates a configuration of a print controller 20 including a front-end device 30 having the third configuration. In FIG. 12, elements similar to the elements illustrated in FIG. 3 are assigned the same numerals.

In the third configuration illustrated by way of example in FIG. 12, an interpretation system 35 includes multiple logical page interpreters 36-*pc* of type 3 (in the illustrated example, two logical page interpreters 36-*pc*1 and 36-*pc*2). The interpretation system 35 does not include the form interpreter 36-*f*.

Each of the logical page interpreters 36-*pc* of type 3 is an interpreter that does not assume the use of the form cache 48, and is configured to interpret print data of an assigned logical page to generate intermediate data and output the intermediate data. That is, unlike the logical page interpreters 36-*pa* of type 1 (FIG. 3) and the like, the logical page interpreters 36-*pc* do not replace commands for rendering forms to be cached with cache reference commands.

Figure 13:
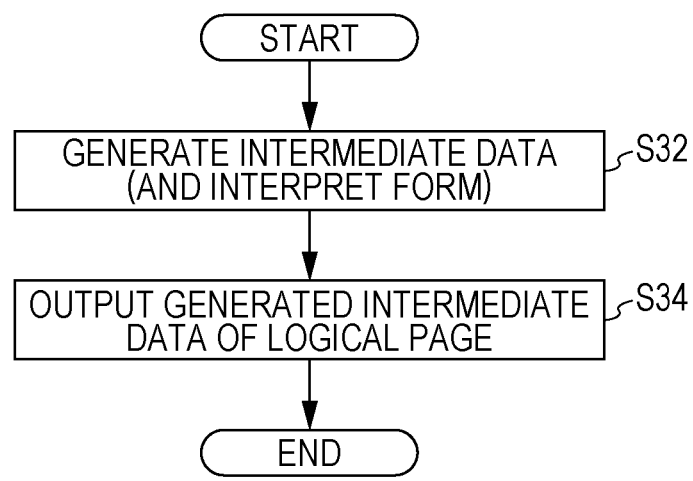
FIG. 13 illustrates an example of a command-by-command processing procedure for a logical page interpreter (type 3)

FIG. 13 illustrates an example of the procedure of a command-by-command interpretation process executed by each of the logical page interpreters 36-*pc* of type 3 (the overall procedure for processing a print job may be performed using the procedure illustrated in FIG. 4). In the illustrated procedure, each of the logical page interpreters 36-*pc* interprets all the commands of the assigned page regardless of whether each command is a command for rendering an object other than a form or a command for rendering a form, and generates intermediate data indicating the results of the interpretation of all the commands (S32). Then, the logical page interpreter 36-*pc* outputs the intermediate data as intermediate data of the page (S34). Therefore, intermediate data of a page generated by each of the logical page interpreters 36-*pc* of type 3 also includes intermediate data indicating an image of a form included in the page.

As may be inferred from the foregoing description, the form cache 48 is not used in the third configuration. The processing procedure for the renderer 44 may be similar to the procedure illustrated by way of example in FIGS. 7 and 8, or a procedure obtained by removing the steps of referring to the cache from the procedure illustrated in FIGS. 7 and 8 may be employed.

In the third configuration, therefore, since the form interpreter 36-*f* dedicated to interpretation of forms is not included, all the available hardware computational resources may be assigned to parallel processing of logical pages.

In the third configuration, intermediate data of forms is not cached. The reason for this is that it is more probable to obtain a higher processing speed than that in a case where intermediate data of a form is cached. If each of the logical page interpreters 36-*pc* is to perform an operation that assumes the use of the form cache 48, operations may be needed such as checking whether or not the desired cache data is present in the form cache 48 and making sure that registered cache data is not redundantly processed. In order to perform such operations, each of the logical page interpreters 36-*pc* needs to access the cache management unit 38 for query (see FIG. 3 and the like: the cache management unit 38 is not included in the configuration illustrated in FIG. 12), and, due to the overhead of communication for the query, an amount of time may be taken to process a print job. Taking such overhead of communication into account, if the number of logical page interpreters 36-*pc* operating in parallel is less than or equal to a certain value, the processing speed may be increased without using a cache. In this case, the lower limit N of the number of logical page interpreters 36-*pa* operating in parallel, described above, is determined by also taking the matters described above into account.

This is merely an example, and the multiple logical page interpreters 36-*pc* used in the third configuration may be configured to assume the use of a cache. In this case, each of the logical page interpreters 36-*pc* executes the processing procedure illustrated in FIG. 10 in a manner similar to that for the logical page interpreter 36-*pb* of type 2. In this case, however, the query in S44 in FIG. 10, which is performed by a logical page interpreter 36-*pc* implemented by a certain CPU core, is interprocess communication to the cache management unit 38 (see FIG. 3), which accompanies another logical page interpreter 36-*pc* implemented by another CPU core.

Figure 14:
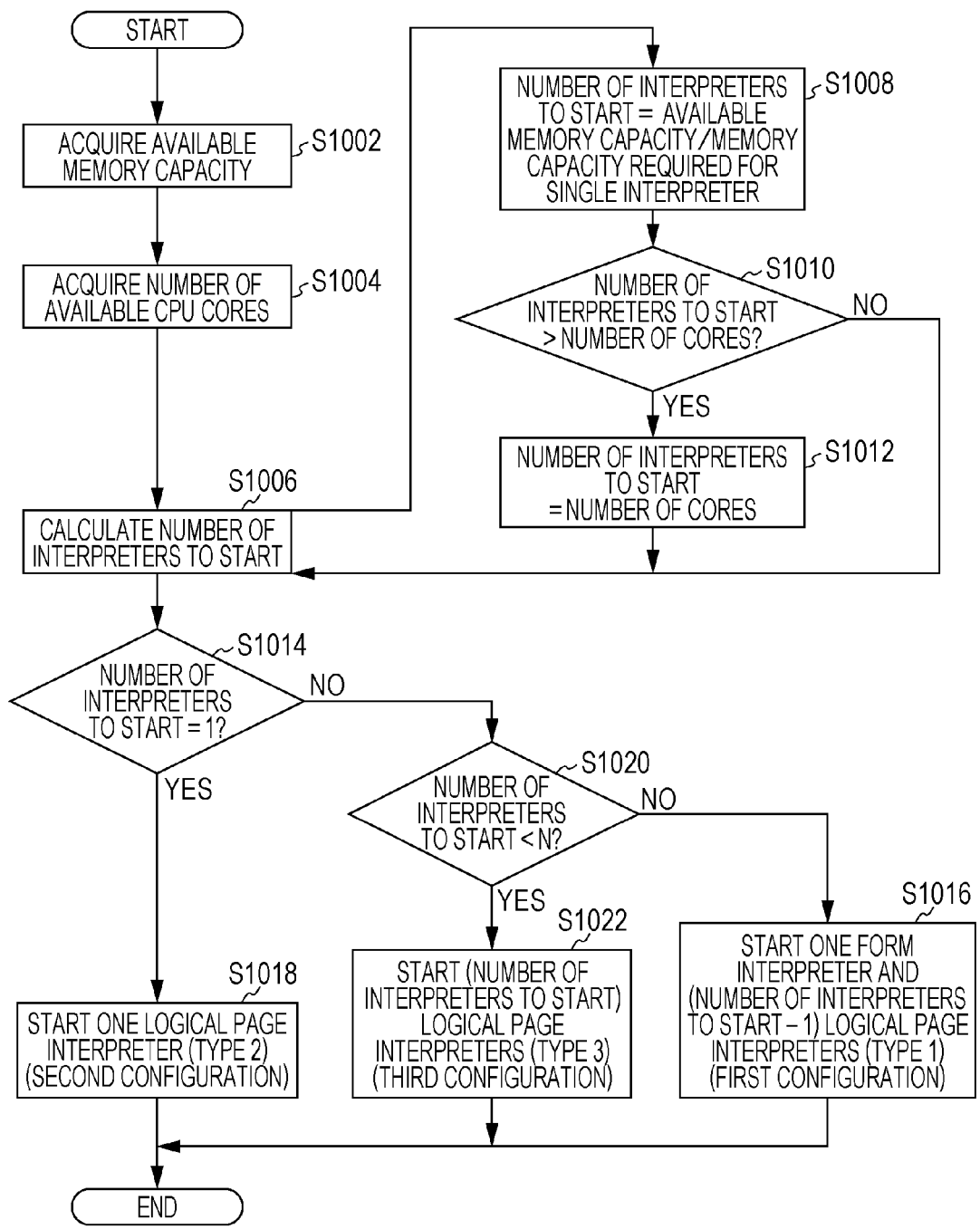
FIG. 14 illustrates an example of a processing procedure of a configuration process for an interpretation system according to the first exemplary modification.

Next, an example of the processing procedure for the number-of-interpreters-to-start determination unit 37 and the configuration controller 39 according to the first exemplary modification will be described with reference to FIG. 14. In FIG. 14, steps similar to the steps illustrated in FIG. 11 are assigned the same numerals.

In the procedure illustrated in FIG. 14, the processing of S1002 to S1014 and S1018 is substantially the same as the corresponding processing in the procedure illustrated in FIG. 11. If it is determined in S1014 that the number of interpreters to start is not equal to 1, in the procedure illustrated in FIG. 14, the configuration controller 39 determines whether or not the number of interpreters to start is less than the lower limit N of the number of logical page interpreters 36-*pa* operating in parallel to make effective the first configuration described above (S1020). The value of the lower limit N is determined by experiment or the like, and is set in advance. If it is determined in S1020 that the number of interpreters to start is less than the lower limit N, the configuration controller 39 starts a number of logical page interpreters 36-*p*3 of type 3 equal to the number of interpreters to start in the interpretation system 35 (S1022: the third configuration illustrated in FIG. 12). If it is determined in S1020 that the number of interpreters to start is greater than or equal to the lower limit N, the configuration controller 39 starts one form interpreter 36-*f* and a number of logical page interpreters 36-*pa* equal to "the number of interpreters to start minus 1" (S1016: the first configuration illustrated in FIG. 3).

Second Exemplary Modification

Next, a second exemplary modification will be described.

In the front-end device 30 having the first configuration (FIG. 3) according to the exemplary embodiment described above, the logical page interpreters 36-*pa*1 and 36-*pa*2 and the form interpreter 36-*f* do not perform interprocess communication for caching. In contrast, the front-end device 30 according to the second exemplary modification has two operation modes, namely, a mode in which interprocess communication is not performed (referred to as a "non-interprocess communication mode"), as in the exemplary embodiment described above, and a mode in which the logical page interpreters 36-*pa*1 and 36-*pa*2 and the form interpreter 36-*f* perform interprocess communication for caching (referred to as an "interprocess communication mode"). The operation modes are switched in accordance with the situation to implement more accurate cache control. An exemplary modification of the first configuration (FIG. 3) described below may be used in combination with the second configuration (FIG. 9) as in the exemplary embodiment described above, or may be used in combination with the second configuration (FIG. 9) and the third configuration (FIG. 12) as in the first exemplary modification described above.

Figure 15:
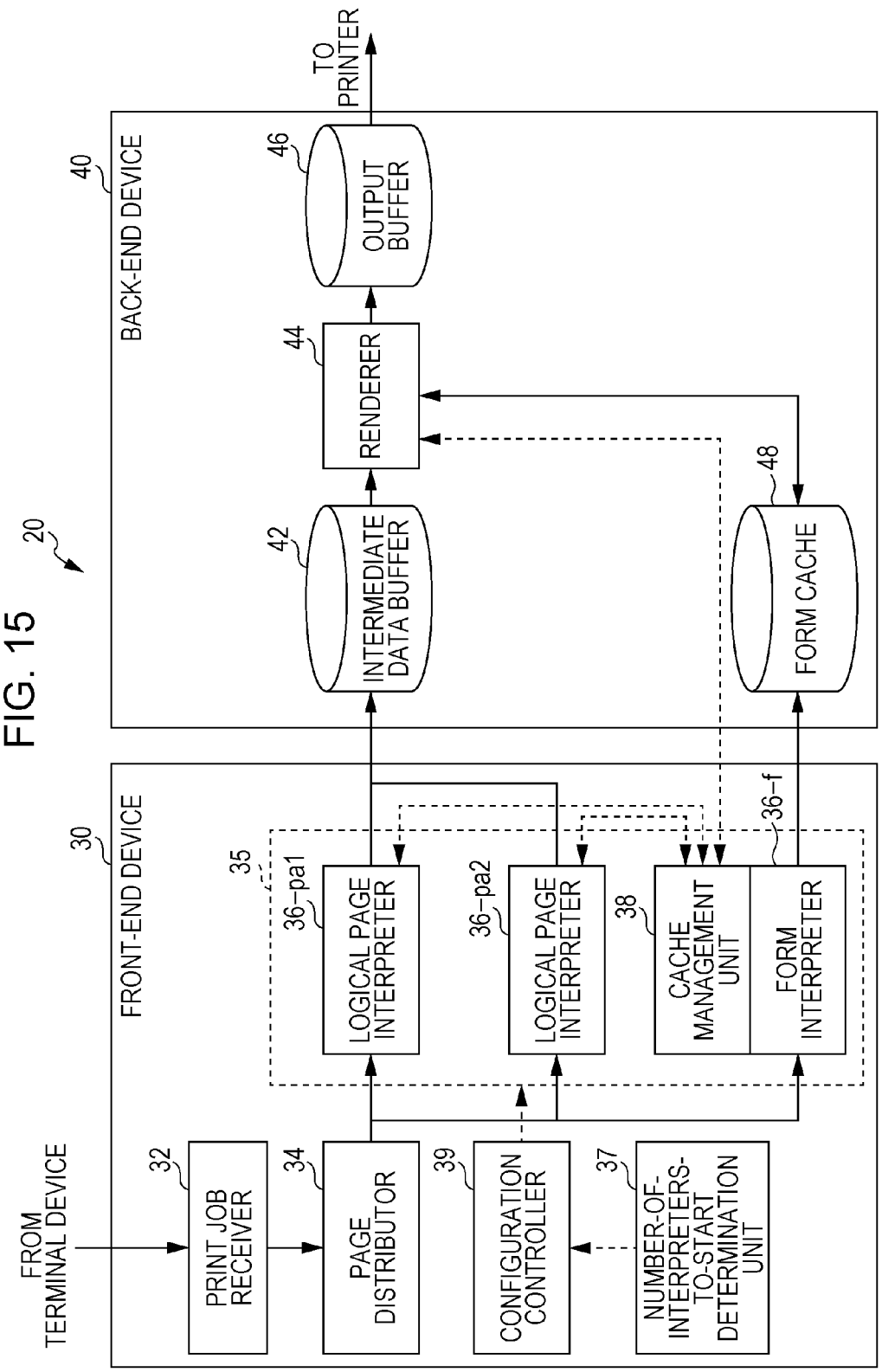
FIG. 15 is a block diagram illustrating an example of an internal configuration of a print controller having the first configuration according to a second exemplary modification.

FIG. 15 illustrates an example configuration of a print controller 20 having a first configuration according to the second exemplary modification. In FIG. 15, elements similar to the elements illustrated by way of example in FIG. 3 are assigned the same numerals.

The configuration illustrated by way of example in FIG. 15 is different from the configuration illustrated in FIG. 3 in that the logical page interpreters 36-*pa*1 and 36-*pa*2 communicate with the cache management unit 38 in the interprocess communication mode (and in that processing procedures are switched in accordance with the communication).

Figure 16:
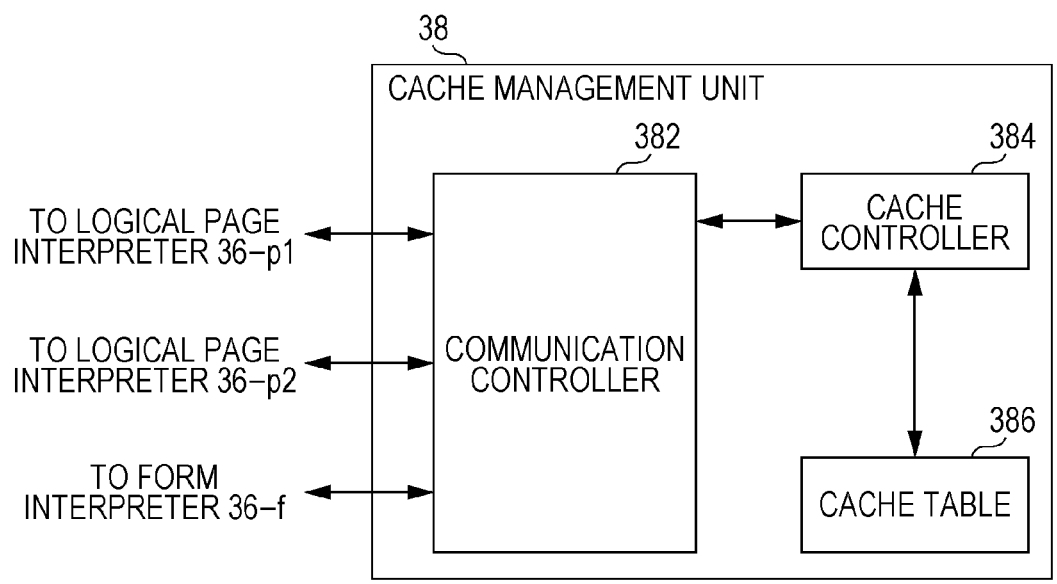
FIG. 16 is a block diagram illustrating an example of an internal configuration of a cache management unit according to the second exemplary modification.

FIG. 16 illustrates an example of an internal configuration of the cache management unit 38 according to the second exemplary modification illustrated in FIG. 15. The cache management unit 38 may be part of the form interpreter 36-*f*, or may be implemented as a process separate from the form interpreter 36-*f*. In the following description, by way of example, the cache management unit 38 is part of the form interpreter 36-*f*.

In the illustrated example, the cache management unit 38 includes a communication controller 382, a cache controller 384, and a cache table 386. The communication controller 382 controls communication with the multiple interpreters 36. The communication controller 382 receives requests, such as cache queries, from the interpreters 36, arbitrates the requests, and passes the requests to the cache controller 384. The cache controller 384 performs an operation for the cache table 386 in accordance with a request received via the communication controller 382. The cache table 386 is a table that holds management information on cache data registered in the form cache 48.

As illustrated in FIG. 17, the cache table 386 has registered therein, for each piece of cache data, a cache ID (here, the hash value of the key data described above), key data, and information on the storage location of the entity of the cache data in the form cache 48. In the illustrated example, cache data is stored in a memory by way of example, and the information on the storage location is represented by the top address of the storage location and the size. Accordingly, cache data may be saved and managed as files instead of being stored in a memory. In this case, the file name of a file storing cache data, rather than the set of address and size, may be recorded as the "storage location".

In the illustrated example, in a case where the entity of cache data is deleted from the form cache 48, the value of the storage location of the cache data in the cache table 386 is changed to a predetermined invalid address and size (for example, NULL value). Therefore, if the entry corresponding to the cache ID (the set of hash value and key data) is present in the cache table 386 and the storage location for the entry is set to a non-NULL value, the entity data (cache data) corresponding to the cache ID is present in the form cache 48.

In the example illustrated in FIG. 17, furthermore, an access count value and a reference count value are recorded for each cache entry in the cache table 386 as numerical value information for cache management.

An access count value is a value indicating the cumulative frequency of use of cache data of the associated entry, and is added by one each time an interpreter 36 refers to the cache ID of the entry. As used herein, the term "referring to" is used when a cache reference command indicating reference to the associated cache ID is incorporated in intermediate data. If, as a result of a query regarding a cache ID to process a form, a logical page interpreter 36-*pa* creates intermediate data representing the entity of the form, rather than a cache reference command, the access count value for the cache ID is not incremented. Cache data having a larger access count value is more frequently used in the previous processing of the print job (that is, the cache data is printed a larger number of times), and would more largely contribute to the increase in processing speed with the use of a cache.

A reference count value is a value indicating the number of references to cache data of the associated entry in intermediate data of pages in the intermediate data buffer 42 (that is, intermediate data that has not been processed by the renderer 44). This value is added by one each time an interpreter 36 refers to the cache ID of the entry, and decreases by one each time the renderer 44 refers to the cache ID of the entry (that is, the cache data of the entry is rendered). If the reference count value for a certain entry is greater than or equal to 1, the intermediate data buffer 42 includes a page for which the cache data of the entry is referred to, and therefore it is difficult to delete the cache data from the form cache 48. If the reference count value for a certain entry is equal to 0, the cache data of the entry may be deleted at the current time point.

In the interprocess communication mode, the access count values and the reference count values are incremented (increase by 1) in accordance with the reference from the logical page interpreters 36-*pa*, and are not incremented in accordance with the reference from the form interpreter 36-*f*. The logical page interpreters 36-*pa* process a group of pages in a print job in a shared manner, and the form interpreter 36-*f* processes all the pages in the print job. Counting references from the logical page interpreters 36-*pa* and the form interpreter 36-*f* may lead to double counting. To avoid such double counting, by way of example, only the references from the logical page interpreters 36-*pa* are counted. The reason for counting the references from the logical page interpreters 36-*pa* rather than the form interpreter 36-*f* is that the number of references from the logical page interpreters 36-*pa* more directly reflect the number of times cache data has been actually referred to in order to generate print images of logical pages. However, this is merely an example, and the references from the form interpreter 36-*f* may be counted in the interprocess communication mode.

In the non-interprocess communication mode, the access count values and the reference count values are incremented (increase by 1) in accordance with the reference from the form interpreter 36-*f*. In the non-interprocess communication mode, no references from the logical page interpreters 36-*pa* are made.

The cache controller 384 monitors the cache table 386 (and therefore the form cache 48) to determine what size of cache data has been registered or deleted, and updates and manages the available capacity of the form cache 48 (that is, "the capacity of the form cache 48" minus "the total size of the cache data in the form cache 48") in accordance with the monitoring process.

Examples of a request sent from the interpreters 36 to the cache controller 384 include a query request, an area reservation request, and a registration request.

The query request is a request for querying whether or not cache data is present in the form cache 48, and a cache ID (a set of hash value and key data) identifying the cache data is used as an argument. Upon receiving a query request, the cache controller 384 searches the cache table 386 for an entry corresponding to the cache ID that is the argument of the request. If such an entry is found and the value of the storage location for the entry is valid, the cache controller 384 determines that "the corresponding cache data is present", and determines that "the corresponding cache data is not present" otherwise. The cache controller 384 sends the determination result to the requesting interpreter 36 via the communication controller 382.

The area reservation request is a request for requesting that the capacity to store the cache data generated by an interpreter 36 be reserved, and for example, a cache ID (a set of hash value and key data) identifying the cache data and the size of the cache data are used as arguments. Upon receiving an area reservation request, the cache controller 384 determines whether or not the size of the cache data, which is the argument, is less than or equal to the available capacity of the form cache 48. If the size is less than or equal to the available capacity, the cache controller 384 reserves a storage location having a size corresponding to the size, and returns an "area reserved" response including information indicating the storage location (for example, the top address and the size). If the size of the cache data, which is the argument, exceeds the available capacity of the form cache 48, the cache controller 384 determines whether or not the area corresponding to the size is reserved by deleting cache data stored in the form cache 48. Here, the cache controller 384 may determine whether or not the available capacity to accommodate the size of the cache data to be newly registered is reserved by searching the cache table 386 for an entry whose reference count value is equal to 0 and deleting the actual data of entries found as a result of the search. Not all the pieces of cache data whose reference count value is equal to 0 may be deleted, but a minimum number of pieces of cache data may be deleted to reserve the available capacity to accommodate the size of the cache data to be registered. In the case, cache data may be preferentially selected as data to be deleted, starting from the cache data having the lowest access count value (that is, the least frequently used cache data).

If the available capacity to satisfy the area reservation request is obtained in this manner by deleting pieces of cache data whose reference count value is equal to 0, the cache controller 384 deletes the respective pieces of cache data selected as data to be deleted from the form cache 48, and reserves a storage location having a size corresponding to the requested size in the available capacity. Then, the cache controller 384 returns a response indicating "successful area reservation" to the requesting interpreter 36. The response includes a cache ID, and information (for example, a set of top address and size) indicating the reserved storage location. The cache controller 384 changes the data in the "storage location" for the entry of the cache in the cache table 386 to a predetermined value indicating "invalid". The interpreter 36 that has received the response indicating "successful area reservation" sends a cache data registration request to the cache management unit 38.

If it is difficult to obtain the available capacity to satisfy the area reservation request even by deleting all the pieces of cache data whose reference count value is equal to 0, the cache controller 384 returns a response indicating "area reservation failure" to the requesting interpreter 36. The interpreter 36 that has received the response indicating "area reservation failure" discards the generated cache data without registering it in a cache.

In the illustrated example, the form interpreter 36-*f* creates cache data of a form, and none of the logical page interpreters 36-*pa* creates cache data (that is, the logical page interpreters 36-*pa* may create intermediate data of forms but do not cache it). Accordingly, an area reservation request and a registration request are issued only from the form interpreter 36-*f*.

Next, the features of the operation modes will be described.

The non-interprocess communication mode provides high-speed processing because of no overhead for communication. However, since cache reference commands generated by the logical page interpreters 36-*pa* are necessarily to be solved (the cache reference commands may not necessarily be solved immediately, but cache data specified by the cache reference commands will be present in the form cache 48), it is difficult to delete cache data from the form cache 48. If cache data is deleted from the form cache 48, cache reference commands generated by the logical page interpreters 36-*pa*, which have failed to recognize the deletion, may not be solved.

In the non-interprocess communication mode, furthermore, as described above, the renderer 44 may wait for necessary cache data to be generated for the initial portion of the print job. The parallel processing may not be expected to speed up.

Due to the overhead for communication, the interprocess communication mode provides lower processing speed than the non-interprocess communication mode. Nevertheless, it may be possible to prevent collapse of a cache-based system even by deleting cache data from the form cache 48. Specifically, each of the logical page interpreters 36-*pa* is configured to check whether or not cache data of a form to which the logical page interpreter 36-*pa* wishes to refer is present in the form cache 48, by using interprocess communication, and to generate intermediate data of the form if the cache data is not present.

Each of the logical page interpreters 36-*pa* may also be configured to check whether or not cache data of a form to which the logical page interpreter 36-*pa* wishes to refer is present in the form cache 48, by performing interprocess communication while processing the initial portion of a print job, and to generate intermediate data of the form if the cache data is not present. This may provide higher speed processing than a method in which the renderer 44 waits for cache data to be generated by the form interpreter 36-*f*, such as the non-interprocess communication mode.

There are two directions of switching of the operation mode of the front-end device 30: (a) switching from the interprocess communication mode to the non-interprocess communication mode, and (b) switching from the non-interprocess communication mode to the interprocess communication mode. The individual switching directions will now be described.

(a) Switching from Interprocess Communication Mode to Non-Interprocess Communication Mode This direction indicates the transition from the state of operation in the interprocess communication mode to the non-interprocess communication mode when a certain condition is satisfied. The switching in this direction is performed in, for example, the initial portion of a print job. In this example, the front-end device 30 is caused to operate in the interprocess communication mode at the time when the print job begins. When the front-end device 30 completes the processing of up to a predetermined proportion of the print job, the operation mode of the front-end device 30 is switched to the non-interprocess communication mode. The threshold at which the switching is performed, that is, the "predetermined proportion" described above, is expressed as, for example, the number of logical pages. For example, the interprocess communication mode is used for up to the n-th page (n is a predetermined integer more than one) from the beginning of the print job, and the non-interprocess communication mode is used after the processing of up to the n-th page has been completed.

Here, for example, n may be defined as follows: n="the number of logical page interpreters 36-*pa* operating in parallel". A sufficient amount of cache data is not accumulated in a period during which a number of pages equal to the "number of logical page interpreters 36-*pa* operating in parallel" in the initial portion of a print job where are processed, and the renderer 44 may be likely to wait for the generation of cache data in the non-interprocess communication mode.

For example, if the number of logical page interpreters 36-*pa* operating in parallel is four, in the initial portion of a print job, four pages, namely, the first to fourth pages, are processed in parallel by four logical page interpreters 36-*pa*. If the processing loads for the four pages are equal, the generation of intermediate data of the four pages is substantially simultaneously completed, and the generated intermediate data is sent to the back-end device 40. Meanwhile, the single form interpreter 36-*f* sequentially generates form cache data, starting from the first page. Thus, if a form appears the first time in the fourth page, the generation of cache data of the form is completed and the generated cache data is sent to the back-end device 40 after passage of a certain amount of time since the start of the processing of the print job. For this reason, when the renderer 44 processes the last pages of the four pages to be subjected to parallel processing, the generation of cache data of forms used in the last pages (particularly, in the fourth page) may fail to catch up with the processing of the renderer 44. This problem is particularly serious in the case of the fourth page. The problem is not as serious in the case of the fifth page or subsequent pages as in the case of the fourth page because the fifth page or subsequent pages are under the second and subsequent rounds of parallel processing, and have sufficient lead time. In addition, the frequency of appearance of a form that first appears decreases (not a few forms to be used in the fifth and subsequent pages are identical to those used in the first to fourth pages).

As may be seen from the example described above, it may be probable that the overall processing speed of the print controller 20 is limited by the processing speed of the form interpreter 36-*f* in a period from the beginning of the print job to the n-th page (n="the number of logical page interpreters 36-*pa* operating in parallel"), for which it is probable that the generation of cache data will not catch up with the processing of logical pages, if the non-interprocess communication mode is employed. If the interprocess communication mode is employed in that period, in contrast, for example, the logical page interpreter 36-*pa* to which the fourth page is assigned may determine whether or not cache data of a form to be cached is obtainable, by using interprocess communication. If the cache data is not obtainable, the logical page interpreter 36-*pa* generates intermediate data of the form, and includes the intermediate data in the processing result of the fourth page. In this case, even though the form interpreter 36-*f* has not completed the generation of cache data of a form in the fourth page at the time when the renderer 44 processes the intermediate data of the fourth page, the renderer 44 may generate raster data of the form from the intermediate data of the fourth page.

(b) Switching from Non-Interprocess Communication Mode to Interprocess Communication Mode This direction indicates the transition from the state of operation in the non-interprocess communication mode to the interprocess communication mode when a certain condition is satisfied. The switching in this direction is performed at the stage when, for example, the total amount of cache data in the form cache 48 approaches the capacity of the form cache 48 (that is, the cache becomes nearly full).

When the total amount of cache data approaches the capacity of the form cache 48, the available capacity of the form cache 48 may be short for new cache data to be registered. In this case, it is desirable that the available capacity be increased by deleting existing cache data in the form cache 48 so that new data may be registered in the form cache 48. As described above, the deletion of some cache data from the form cache 48 in the non-interprocess communication mode may make it impossible to render a page that is based on the premise that the cache data thereof is present. In the interprocess communication mode, on the other hand, each of the logical page interpreters 36-*pa* constantly checks whether or not cache data of a necessary form is obtainable, and generates an intermediate data command for referring to the cache data if the cache data is obtainable, or generates intermediate data indicating the entity of the form if the cache data is not obtainable. This may prevent unwanted situation such as rendering becoming impossible due to lack of expected cache data.

Conversely, in a situation where the total amount of cache data in the form cache 48 is not so large and the available capacity is sufficiently large to store newly generated cache data, the employment of the non-interprocess communication mode having a high processing speed may provide higher processing efficiency.

Accordingly, control may be performed so that the non-interprocess communication mode is used before the total amount of cache data approaches the capacity of the form cache 48 and is switched to the interprocess communication mode when the total amount of cache data approaches the capacity of the form cache 48.

Whether or not "the total amount of cache data approaches the capacity of the form cache 48" may be determined by, for example, comparing the total amount of cache data in the form cache 48 with a threshold value. In this example, for example, a threshold value is determined based on a memory capacity (=the upper limit value of the total amount of cache data) allocated to the form cache 48 (using a method of, for example, setting 90% of the memory capacity as a threshold value), and it is determined that "the total amount of cache data approaches the capacity of the form cache 48" when the total amount of cache data in the form cache 48 reaches the threshold value.

Next, an example of the procedure for the switching control of the operation modes according to the second exemplary modification will be described. In the following description, the procedure for the switching control is performed by the page distributor 34, by way of example. This is merely an example. The following procedure may be performed by, for example, the cache management unit 38 or by using a dedicated function module for executing the procedure.

Figure 18:
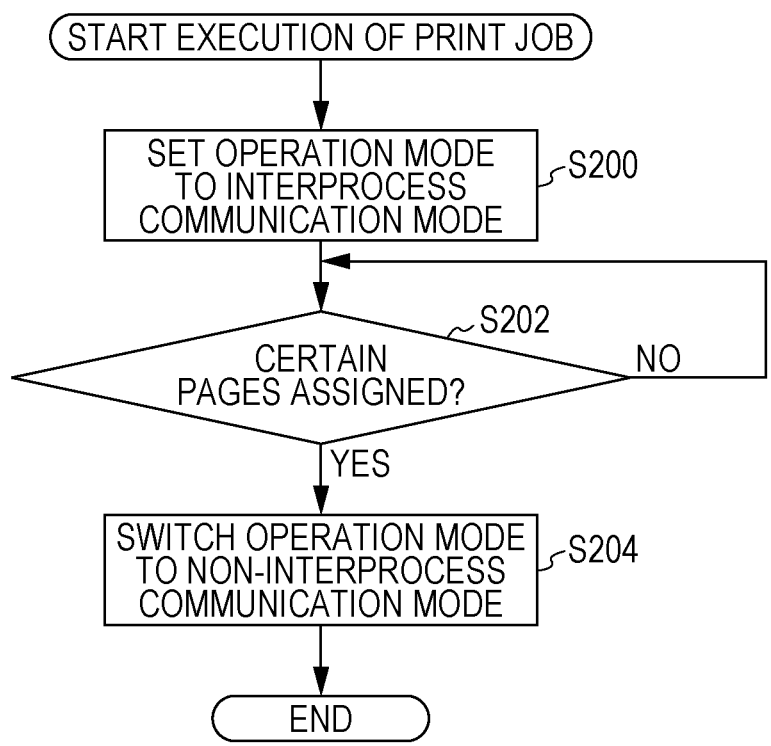
FIG. 18 illustrates an example of a procedure for switching control of operation modes.

FIG. 18 illustrates a first example of the procedure for the switching control of the operation modes. In the illustrated example, when a print job process starts, the page distributor 34 sets the operation mode of the front-end device 30 to the interprocess communication mode (S200). This may prevent waiting for the generation of cache data at the start of the job, and may suppress a reduction in processing speed. After that, the page distributor 34 records the latest page number among the assigned page numbers each time pages are assigned to the logical page interpreters 36-*pa*, and maintains the interprocess communication mode if the recorded latest page number is less than or equal to a predetermined threshold value (if the determination result of S202 is negative (NO)). If the recorded latest page number exceeds the predetermined threshold value (the determination result of S202 is positive (YES)), the page distributor 34 switches the operation mode of the front-end device 30 to the non-interprocess communication mode (S204). This may increase processing speed. If the capacity of the form cache 48 is larger than the total amount of intermediate data of a form to be cached which is used in a print job, the procedure illustrated in FIG. 18 works without any problem.

Figure 19:
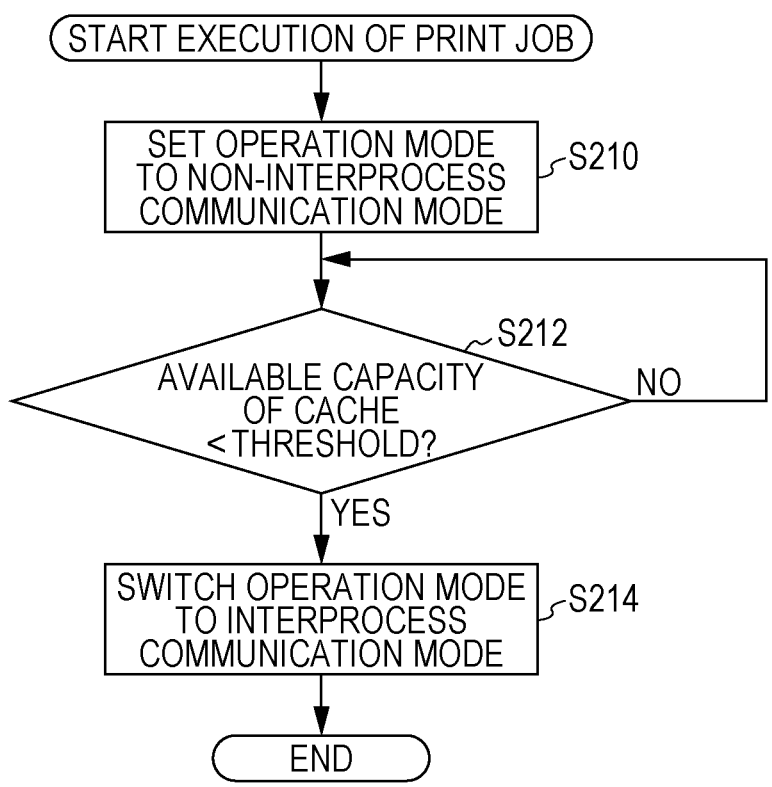
FIG. 19 illustrates another example of the procedure for switching control of operation modes.

FIG. 19 illustrates a second example of the procedure for the switching control of the operation modes. In the illustrated example, when a print job process starts, the page distributor 34 sets the operation mode of the front-end device 30 to the non-interprocess communication mode (S210). After that, the page distributor 34 monitors the available capacity of the form cache 48 (the available capacity may be determined by querying the cache management unit 38). If the available capacity is greater than or equal to a predetermined threshold value (the determination result of S212 is negative (NO)), the page distributor 34 maintains the non-interprocess communication mode. If the available capacity of the form cache 48 is lower than the threshold value (the determination result of S212 is positive (YES)), the page distributor 34 switches the operation mode of the front-end device 30 to the interprocess communication mode (S214). This enables existing cache data in the form cache 48 to be deleted, and new necessary cache data to be registered. The illustrated procedure may be inferior to that in the first example described above in terms of the processing speed at the start of the job, but may appropriately work even if the capacity of the form cache 48 is lower than the total amount of intermediate data of a form to be cached which is used in the print job.

Figure 20:
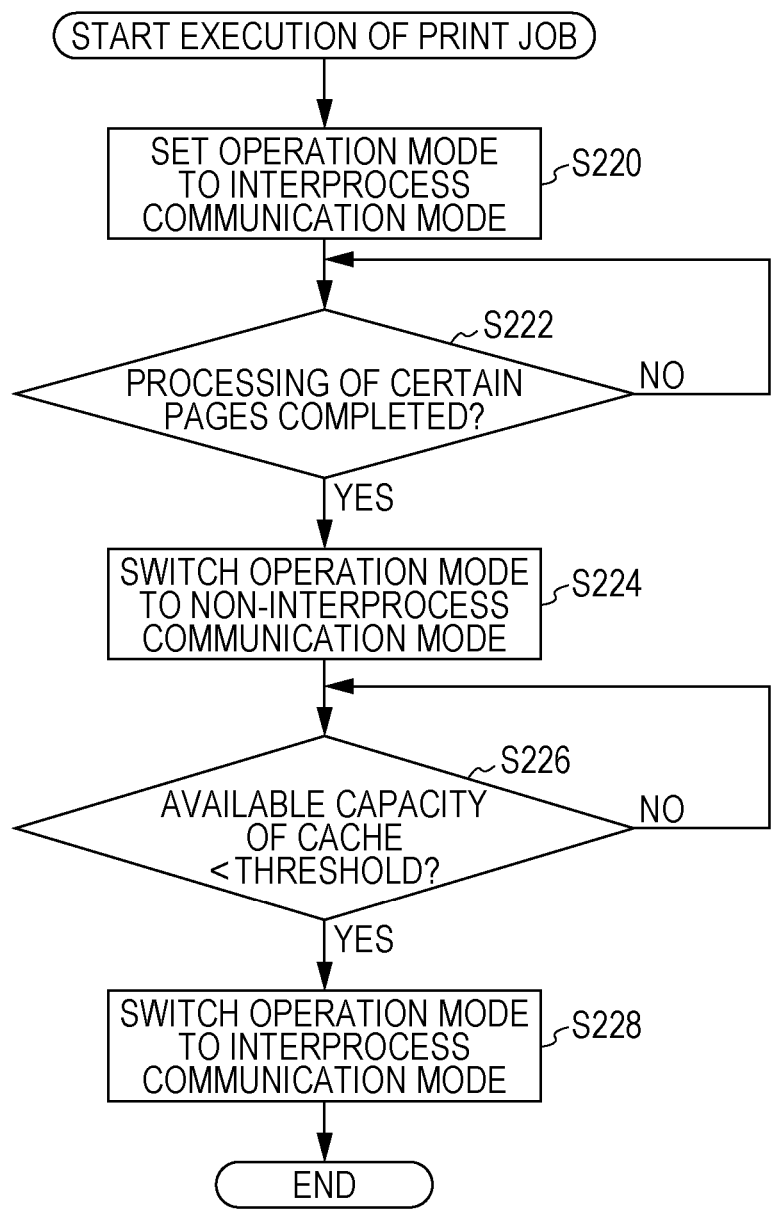
FIG. 20 illustrates still another example of the procedure for switching control of operation modes.

FIG. 20 illustrates a third example of the procedure for the switching control of the operation modes. The illustrated example is a combination of the first and second examples described above. In the illustrated example, when a print job process starts, the page distributor 34 sets the operation mode of the front-end device 30 to the interprocess communication mode (S220). Then, each time pages are assigned to the logical page interpreters 36-*pa*, the page distributor 34 compares the latest page number among the assigned page numbers with a threshold value (S222). If the latest page number is less than or equal to the threshold value (the determination result of S222 is negative (NO)), the page distributor 34 maintains the interprocess communication mode. If the latest page number exceeds the threshold value (the determination result of S222 is positive (YES)), the page distributor 34 switches the operation mode of the front-end device 30 to the non-interprocess communication mode (S224). After that, the available capacity of the form cache 48 is compared with a predetermined threshold value (S226). If the available capacity is greater than or equal to the threshold value (the determination result of S226 is negative (NO)), the page distributor 34 maintains the non-interprocess communication mode. If the available capacity is lower than the threshold value (the determination result of S226 is positive (YES)), the page distributor 34 switches the operation mode of the front-end device 30 to the interprocess communication mode (S228). After the operation mode is switched to the interprocess communication mode, the following process flow is used: When cache data to be newly cached is generated, existing cache data is deleted from the form cache 48 to increase the available capacity if the available capacity of the form cache 48 is short, and the new cache data is stored in the increased available capacity. Since the available capacity of the form cache 48 is not generally increased greatly in the process described above, the interprocess communication mode is maintained until the print job is completed. However, taking into account the possibility that the available capacity of the form cache 48 may be greatly increased for some reasons, the available capacity of the form cache 48 may also be monitored after the processing of S228, and the operation mode of the front-end device 30 may be switched to the non-interprocess communication mode if the available capacity exceeds a predetermined threshold value (the threshold value may be equal to the threshold value in S226 but is more desirably larger than the threshold value in S226).

Figure 21:
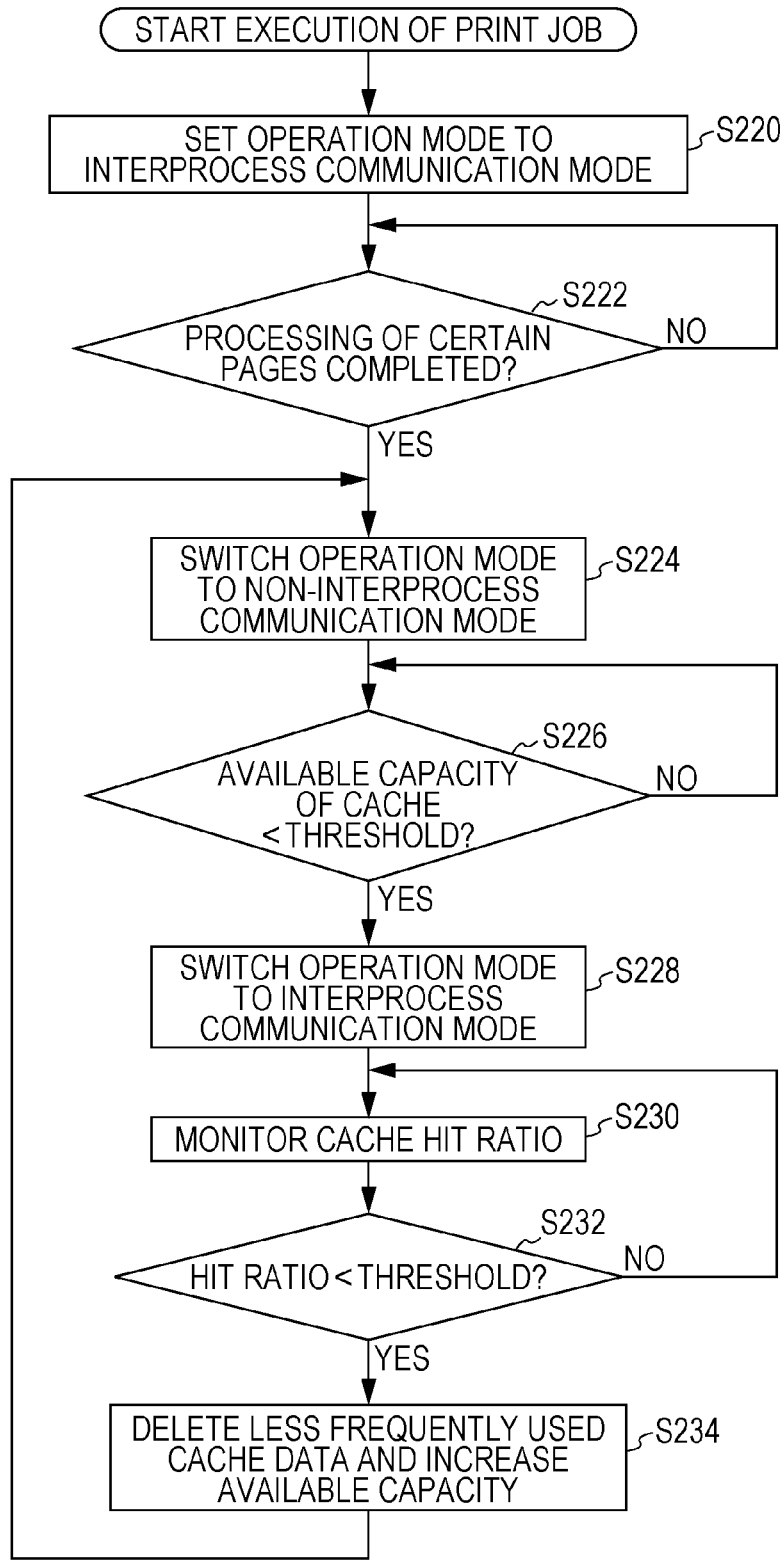
FIG. 21 illustrates still another example of the procedure for switching control of operation modes.

FIG. 21 illustrates a fourth example of the procedure for the switching control of the operation modes. The illustrated example is an improvement in the third example. In FIG. 21, steps similar to the steps illustrated in FIG. 20 are assigned the same numerals, and a description thereof is omitted.

This process is based on the premise that the cache management unit 38 manages hit ratios of the form cache 48. For example, the cache management unit 38 has records of the total number of query requests as to the presence or absence of cache data received from the logical page interpreters 36-*pa*, and the number of responses indicating "the corresponding cache data is present" (that is, "cache hit") with respect to the total number of query requests. The cache management unit 38 constantly determines and holds the latest hit ratio (number of hits÷total number of queries) from the recorded values.

In the procedure illustrated in FIG. 21, after the transition to the interprocess communication mode in S228, for example, the page distributor 34 periodically queries the cache management unit 38 about the hit ratio (S230). If the hit ratio is greater than or equal to a predetermined threshold value (the determination result of S232 is negative (NO)), the page distributor 34 maintains the interprocess communication mode. That is, if the hit ratio is greater than or equal to the threshold value, the page distributor 34 regards the form cache 48 as being efficiently utilized, and maintains the current state.

If the hit ratio is lower than the threshold value (the determination result of S232 is positive (YES)), this implies that the pieces of cache data stored in the form cache 48 are not frequently used. Such a situation may occur when, for example, the forms being used are replaced with different forms in the middle of the print job. That is, the cache data stored in the form cache 48 before the replacement of the forms is not frequently used after the replacement of the forms, whereas new forms after the replacement of the forms may be difficult to register in the form cache 48 due to the shortage of the available capacity, causing a reduction in hit ratio. In this case, the page distributor 34 instructs the cache management unit 38 to delete cache data that is not efficiently utilized in a batch from the form cache 48 (S234).

In response to the instruction, the cache management unit 38 specifies cache data that is not currently efficiently utilized in accordance with the information in the cache table 386. For example, the index value of the frequency of use of each piece of cache data, which is given by "access count value÷total number of currently assigned pages", may be calculated. If the index value is greater than or equal to a predetermined threshold value, the cache data may be determined to be "currently efficiently utilized", and, if the index value is lower than the threshold value, the cache data may be determined not to be "currently efficiently utilized". Then, cache data whose reference count value is equal to 0 (that is, cache data currently not being referred to) in the specified cache data determined not to be "currently efficiently utilized" is deleted in a batch from the form cache 48.

The value given by "access count value÷total number of currently assigned pages" is low for, for example, cache data that is utilized in the initial portion of the job but is not utilized later or for cache data that begins to be utilized in a recent page. Since the latter cache data is recently utilized, the latter cache data may be less likely to be deleted in a batch because it is probable that the reference count value is greater than or equal to 1.

Alternatively, as illustrated by way of example in FIG. 22, the cache table 386 may manage recent access count values in addition to a cumulative access count value, and pieces of cache data having small recent access count values (for example, recent access count values smaller than a predetermined threshold value) may be deleted in a batch in S234. Examples of the "recent access count value" may include the sum of access count values for the most recent pages from the present, the number of which is equal to a predetermined value.

Figure 23:
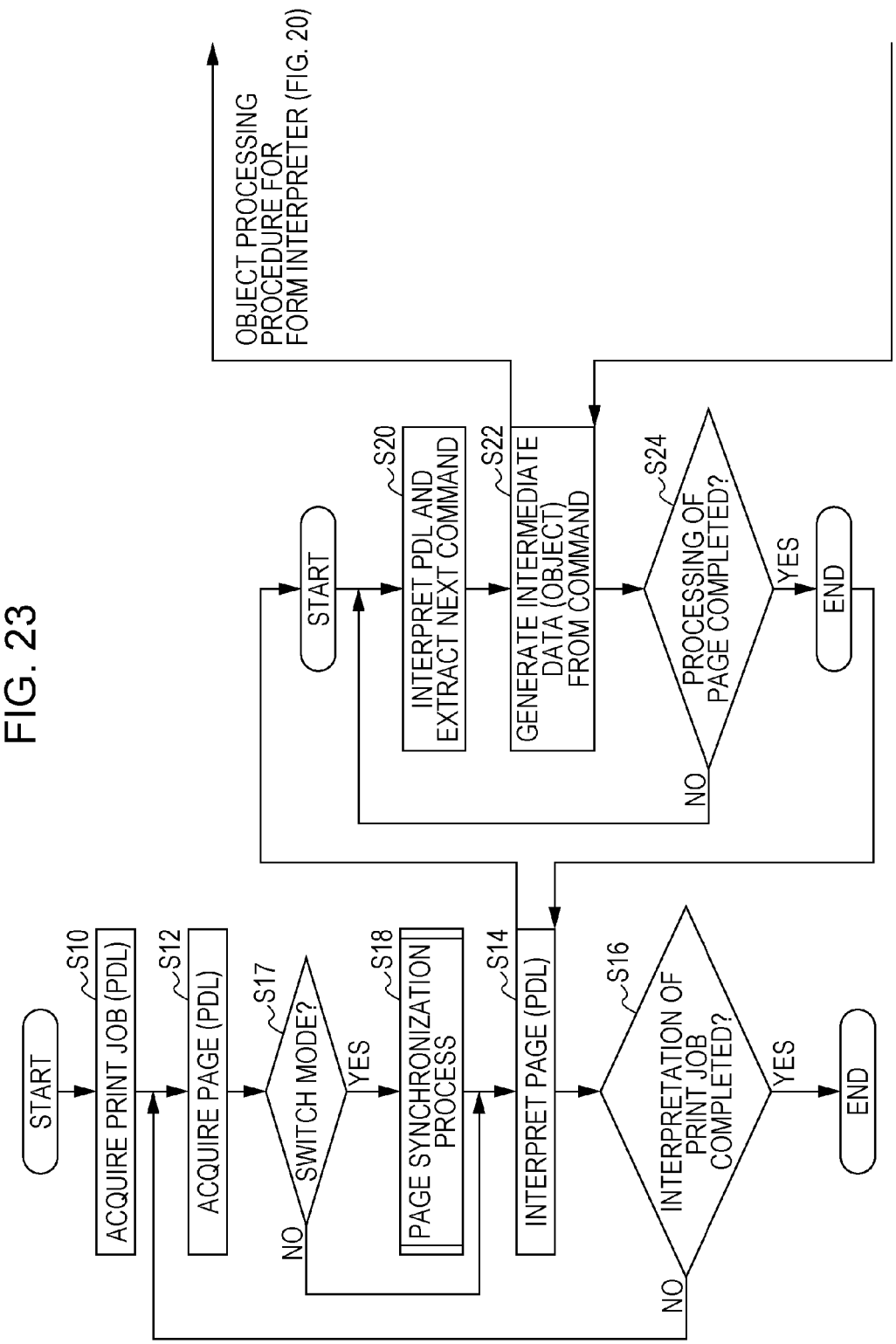
FIG. 23 illustrates an example of an overall processing procedure for a form interpreter in the first configuration according to the second exemplary modification.

FIG. 23 illustrates an overall processing procedure for the form interpreter 36-*f* according to the second exemplary modification. In the illustrated procedure, the processing of S17 and S18, which may be used for the switching of operation modes, is added to the overall processing procedure for the logical page interpreters 36-*pa* and the form interpreter 36-*f* illustrated by way of example in FIG. 4.

In the procedure illustrated in FIG. 23, upon assignment of a new page from the page distributor 34 (S12), the form interpreter 36-*f* determines whether or not the switching of the operation mode is in progress (S14). If the "switching of the operation mode is not in progress", the process proceeds to S14. Accordingly, substantially the same process as that illustrated in FIG. 4 is performed. If the "switching of the operation mode is in progress", a page synchronization process is performed (S18).

The state where the "switching of the operation mode is in progress" is a state where the operation mode of the front-end device 30 is being switched from the current operation mode to the specified operation mode (transition stage). In this state, the form interpreter 36-*f* and the logical page interpreters 36-*pa* in the front-end device 30 perform a page synchronization process described below. During the page synchronization process, either the form interpreter 36-*f* or the logical page interpreters 36-*pa* suspend the processing and enter a standby state, and the other interpreter or interpreters advance the processing, thus allowing synchronization of the pages being processed by the form interpreter 36-*f* and the logical page interpreters 36-*pa*. The operation mode is not switched at the state where the "switching of the operation mode is in progress", and is not switched until the state where the "switching of the operation mode is in progress" is released.

In the illustrated example, upon receipt of an instruction for switching the operation mode, the front-end device 30 enters the state where the "switching of the operation mode is in progress". In this state, the front-end device 30 prepares for the switching of the operation mode, but does not switch the operation mode. After that, the state where the "switching of the operation mode is in progress" continues until the page synchronization process is completed. When the page synchronization process is completed, the state where the "switching of the operation mode is in progress" is released, and the operation mode is switched. In the illustrated example, the page distributor 34 determines whether or not the switching of the operation mode in the respective directions given in the items (a) and (b) described above is needed, in accordance with information as to up to which page the logical page interpreters 36-*pa* and the form interpreter 36-*f* have been assigned and information on the total amount of cache data currently being cached, which is managed by the cache management unit 38. If the switching of the operation mode is needed, the page distributor 34 instructs the form interpreter 36-*f* to switch the operation mode. In accordance with the instruction, the form interpreter 36-*f* enters the state where the "switching of the operation mode is in progress", and executes a page synchronization process (S18).

The page synchronization process is a process for making the progress of page processing performed by the logical page interpreters 36-*pa* operating in parallel and the form interpreter 36-*f* match (that is, making the page numbers being processed by the logical page interpreters 36-*pa* operating in parallel and the form interpreter 36-*f* coincide).

Figure 24:
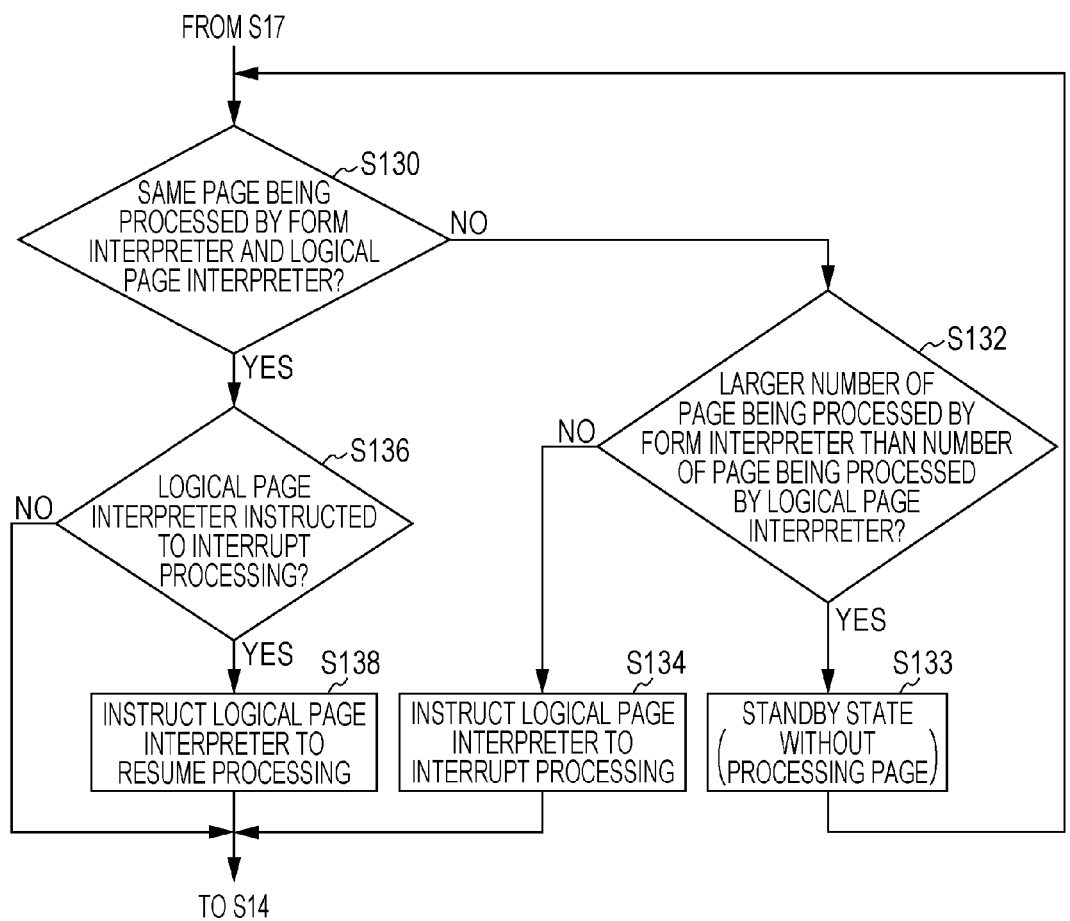
FIG. 24 illustrates an example of a procedure of a page synchronization process in the first configuration according to the second exemplary modification.

FIG. 24 illustrates an example of the processing procedure of the page synchronization process (S18). In the illustrated example, the form interpreter 36-*f* determines whether or not the number Nf of the page currently being processed by the form interpreter 36-*f* is equal to the largest number Np of the numbers of the pages currently being processed by the multiple logical page interpreters 36-*pa* (S130). The values Nf and Np may be obtained by querying the page distributor 34. If the values Nf and Np are not equal, the processing of forms and the processing of logical pages are not synchronous. In this case, the form interpreter 36-*f* further compares the values Nf and Np, and determines whether or not the value Nf is larger than the value Np (S132).

If the determination result is negative (NO), this implies that the process for interpreting the logical pages takes place ahead of the process for interpreting forms. Thus, the form interpreter 36-*f* instructs each of the logical page interpreters 36-*pa* to interrupt the processing (S134). Upon receipt of the instruction, each of the logical page interpreters 36-*pa* suspends the processing immediately after, for example, completing the generation of intermediate data for the page currently being processed, and enters a standby state without requesting the page distributor 34 to distribute the subsequent page. The suspension of the processing continues until a process resume instruction is received. After the processing of S134, the form interpreter 36-*f* proceeds to S14 (FIG. 23), and performs a process for interpreting the form in the current page and generating intermediate data. Upon assignment of the subsequent page (S12 in FIG. 23), the form interpreter 36-*f* performs the page synchronization process illustrated in FIG. 24 because it is still in the state where the "switching of the operation mode is in progress". In this manner, the processing loop of S130, S132, S134, S14, S12, S17, and S130 in this order is repeatedly performed until the processing of the form interpreter 36-*f* overtakes the progress of the processing of the logical page interpreters 36-*pa* that has been suspended.

When the progress of the processing of the form interpreter 36-*f* overtakes the progress of the processing of the logical page interpreters 36-*pa*, the determination result of S130 is positive (YES). In this case, the form interpreter 36-*f* exits the state where the "switching of the operation mode is in progress", and switches its operation mode. The form interpreter 36-*f* further determines whether or not a process interrupt instruction has been issued to the logical page interpreters 36-*pa* (S136). If a process interrupt instruction has been issued, the form interpreter 36-*f* issues a process resume instruction to the logical page interpreters 36-*pa* (S138). In response to the process resume instruction, each of the logical page interpreters 36-*pa* switches its operation mode, and resumes the processing.

If the determination result of S132 is positive (YES), the form interpreter 36-*f* enters a standby state without processing the page assigned in S12 (S133), and then returns to S130. In this manner, the processing loop of S130, S132, S133, S12, S17, and S130 in this order is repeatedly performed until the processing of the logical page interpreters 36-*pa* catches up with the progress of the processing of the form interpreter 36-*f* that is in a standby state. When the progress of the processing of the logical page interpreters 36-*pa* catches up with the progress of the processing of the form interpreters 36-*f*, the determination result of S130 is positive (YES). Then, the form interpreter 36-*f* switches its operation mode, and also instructs each of the logical page interpreters 36-*pa* to switch the operation mode of the logical page interpreter 36-*pa*.

The page synchronization process described above is an example. The page synchronization process is performed when an operation mode is switched, thus allowing the processing in the operation mode after switching to start with a state where the progress of the processing of the form interpreter 36-*f* matches the progress of the processing of the logical page interpreters 36-*pa*.

For example, in the non-interprocess communication mode, the logical page interpreters 36-*pa* are processing pages whose numbers are larger than the number of the page currently being processed by the form interpreter 36-*f*. At this time point, it is probable that intermediate data of a page including a cache reference command for referring to cache data that has not been created is present in the intermediate data buffer 42. It is assumed that, at this time point, the operation mode is switched from the non-interprocess communication mode to the interprocess communication mode because the total amount of cache data has approached the capacity of the form cache 48. In this case, it may be possible to delete existing cache data from the form cache 48 in order to store newly generated cache data in the form cache 48 in accordance with the switching to the interprocess communication mode. Accordingly, cache data referred to by a page that is stored in the intermediate data buffer 42 and that has not been processed by the renderer 44 may be deleted from the form cache 48, resulting in the possibility that an image of the page will not be generated.

In addition, in the interprocess communication mode, the logical page interpreters 36-*pa* are processing pages whose numbers are larger than the number of the page currently being processed by the form interpreter 36-*f*. In this situation, in response to a query regarding the presence or absence of cache data of a newly appearing form from one of the logical page interpreters 36-*pa*, the cache management unit 38 returns a response indicating "no cache data", and the corresponding logical page interpreter 36-*pa* creates intermediate data that does not refer to a cache (including intermediate data of the form). After that, the cache data of the form may be registered in the form cache 48 at the time when the form interpreter 36-*f* processes the form. However, it is difficult to determine whether or not the registered cache data will be used for subsequent pages. In this manner, it is probable that cache data that may not possibly be referred to is registered.

The inconvenience described above by way of example may be addressed by performing a page synchronization process during the switching of the operation mode.

In the example illustrated in FIG. 24, page synchronization is performed so that the pages being processed by the logical page interpreters 36-*pa* and the form interpreter 36-*f* have the same page number. This is merely an example. Alternatively, synchronization may be performed so that the form interpreter 36-*f* is processing a page whose page number is slightly larger than the page numbers of the pages being processed by the logical page interpreters 36-*pa*. That is, if the page being processed by the form interpreter 36-*f* is slightly ahead of the pages being processed by the logical page interpreters 36-*pa*, cache data of a form included in the page being processed by the logical page interpreter 36-*pa* is substantially always present in the form cache 48 regardless of either the non-interprocess communication mode or the interprocess communication mode. This enables the most effective use of the effect of parallel processing and utilization of cache, and enables high-speed processing. If the page being processed by the form interpreter 36-*f* is largely ahead of the pages being processed by the logical page interpreters 36-*pa*, it is probable that the cache data created by the form interpreter 36-*f* may be deleted because of acute shortage of the available capacity of the cache and the like before the cache data is used to render a logical page. Such an inconvenience may be addressed by performing synchronization during the switching of the operation mode so that the page being processed by the form interpreter 36-*f* is slightly ahead of the pages being processed by the logical page interpreters 36-*pa*, and high-speed processing may be provided.

Alternatively, page synchronization may be performed within a certain amount of range so that the page number of the page being processed by the form interpreter 36-*f* is the same as or is slightly larger than the page numbers of the pages being processed by the logical page interpreters 36-*pa*.

In the example illustrated in FIGS. 23 and 24, the form interpreter 36-*f* executes a page synchronization process. Instead of this, the page distributor 34 may perform a page synchronization process or a function module dedicated for the page synchronization process may be provided.

The form cache 48 and the cache management unit 38 may not necessarily be reset (or cleared) at the time of switching from the interprocess communication mode to the non-interprocess communication mode. After switching, the form interpreter 36-*f* may query the cache management unit 38 about the presence or absence of the cache entry corresponding to the form each time the form interpreter 36-*f* finds a form to be cached from PDL data.

In addition, the access count value of each cache entry may be reset at the time of switching from the interprocess communication mode to the non-interprocess communication mode. This may be effective particularly for the operation mode switching method illustrated in FIG. 21. Resetting of the access count value when the operation mode is switched to the non-interprocess communication mode in S224 in response to the detection of a reduction in hit ratio of the cache in S232 allows the information on the number of times access has been made to be cleared. The access count value may reflect a more recent state of use of the cache, leading to an increase in cache use efficiency.

In addition, the form cache 48 and the cache management unit 38 may not necessarily be reset (or cleared) at the time of switching from the non-interprocess communication mode to the interprocess communication mode. After switching, the form interpreter 36-*f* may inform the cache management unit 38 of whether or not to cache intermediate data of a form.

An example of the overall processing procedure for the form interpreter 36-*f* has been described with reference to FIGS. 23 and 24. The overall processing procedure for each of the logical page interpreters 36-*pa* may be similar to the procedure illustrated in FIG. 4.

Next, an example of a command-by-command processing procedure for each of the logical page interpreters 36-*pa* (the detailed procedure of S22 in FIG. 4) will be described with reference to FIG. 25. In the procedure illustrated in FIG. 25, the processing of S41 and S44 is added to the procedure according to the exemplary embodiment illustrated by way of example in FIG. 5.

Figure 25:
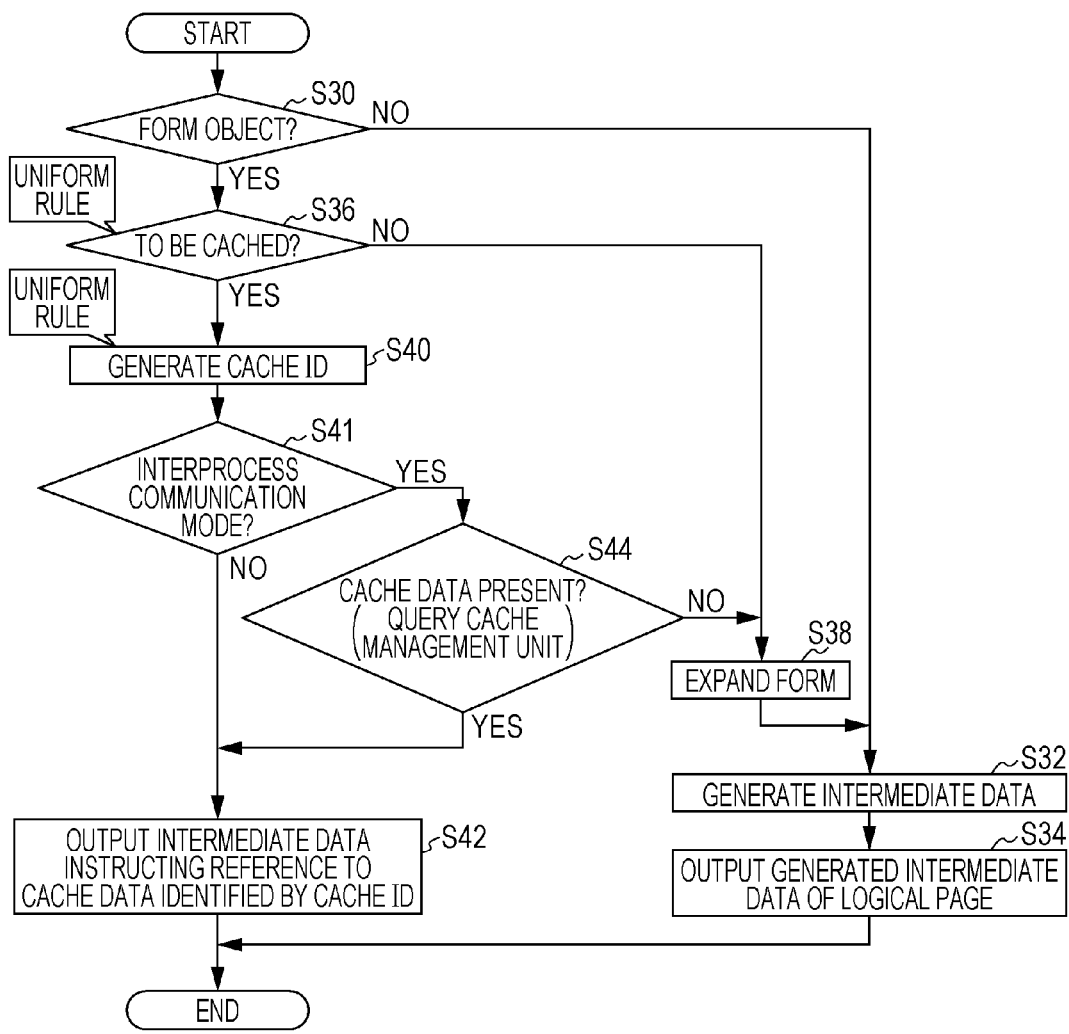
FIG. 25 illustrates an example of a command-by-command processing procedure for a logical page interpreter (type 1) according to the second exemplary modification.

In the procedure illustrated in FIG. 25, each of the logical page interpreters 36-*pa* generates a cache ID corresponding to a form (S40), and then determines whether or not the current operation mode is the interprocess communication mode (S41).

If the current operation mode is the interprocess communication mode, the logical page interpreter 36-*pa* performs interprocess communication, and sends a query request to the cache management unit 38 using the cache ID as an argument, thereby querying whether or not the cache data corresponding to the cache ID is present in the form cache 48 (S44). If a response indicating "the corresponding cache data is present" is sent from the cache management unit 38 in response to the query (the determination result of S44 is positive (YES)), the logical page interpreter 36-*pa* proceeds to S42, and generates and outputs a reference command for referring to the cache ID. If a response indicating "the corresponding cache data is not present" is returned in response to the query, the logical page interpreter 36-*pa* expands the PDL data of the form onto the memory (S38), interprets the PDL data to generate intermediate data of the form (S32), and outputs the generated intermediate data (S34). In the interprocess communication mode, therefore, whether or not cache data is present in the form cache 48 is checked, and a command for referring to the cache data is created only when it is confirmed that the cache data is present.

If the current operation mode is the non-interprocess communication mode (the determination result of S41 is negative (NO)), the logical page interpreter 36-*pa* proceeds to S42, in which the logical page interpreter 36-*pa* generates a reference command for referring to the cache ID, and outputs the reference command. In the non-interprocess communication mode, since it is guaranteed that necessary cache data is obtainable, a command for referring to cache data is created without querying the cache management unit 38. This processing is substantially the same as that in the exemplary embodiment illustrated in FIG. 5.

Next, an example of a command-by-command processing procedure for the form interpreter 36-*f* (the detailed procedure of S22 in FIG. 23) will be described with reference to FIG. 26. In the procedure illustrated in FIG. 26, the processing of S55, S57, and S60 to S66 is added to the procedure in the exemplary embodiment illustrated by way of example in FIG. 6.

Figure 26:
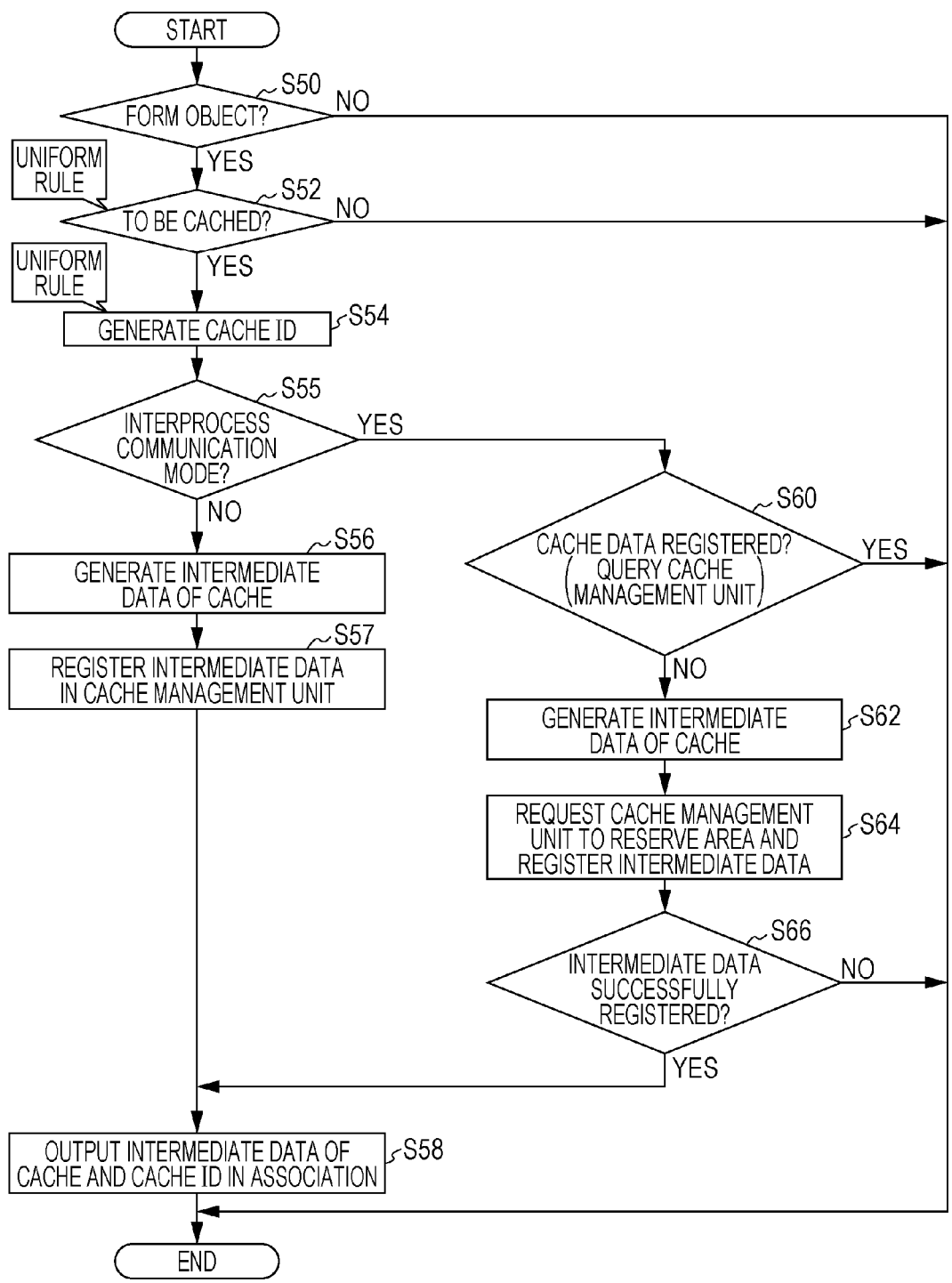
FIG. 26 illustrates an example of a command-by-command processing procedure for the form interpreter in the first configuration according to the second exemplary modification.

In the procedure illustrated in FIG. 26, the form interpreter 36-*f* generates a cache ID corresponding to a form (S54), and then determines whether or not the current operation mode is the interprocess communication mode (S55).

If the current operation mode is the non-interprocess communication mode (the determination result of S55 is negative (NO)), the form interpreter 36-*f* generates intermediate data of the form (S56), and sends a registration request to the cache management unit 38 to register the intermediate data in the form cache 48 as cache data (S57). In response to the registration request, the cache management unit 38 registers information on the cache data in the cache management unit 38. Then, the form interpreter 36-*f* sends the created intermediate data to the form cache 48 in association with the corresponding cache ID, thereby registering the cache data (S58). In the processing of S57 and S58, as in the exemplary embodiment described above, the form interpreter 36-*f* queries the cache management unit 38 whether or not the cache data of the form has been registered, and does not redundantly register the cache data if the cache data has been registered. In this manner, the processing in the non-interprocess communication mode is basically the same as the processing according to the exemplary embodiment described above illustrated in FIG. 6.

If the current operation mode is the interprocess communication mode (the determination result of S55 is positive (YES)), the form interpreter 36-*f* sends a query request to the cache management unit 38 using the cache ID as an argument to query whether or not the cache data corresponding to the cache ID is present in the form cache 48 (S60). If a response indicating "the corresponding cache data is present" is sent from the cache management unit 38 in response to the query (the determination result of S60 is positive (YES)), the form interpreter 36-*f* terminates the process to avoid redundant generation and registration of the same cache data.

If a response indicating "the corresponding cache data is not present" is sent from the cache management unit 38 in response to the query in S60, the form interpreter 36-*f* generates intermediate data of the form (S62), and sends an area reservation request including the size of the generated intermediate data and the cache ID to the cache management unit 38. If a response indicating "successful area reservation" is returned in response to the request, the form interpreter 36-*f* sends a registration request to the cache management unit 38 to register the intermediate data (S64). Since it is possible to register the created intermediate data of the form in the form cache 48 (the determination result of S66 is positive (YES)), the form interpreter 36-*f* sends the intermediate data to the form cache 48 in association with the cache ID (S58). If a response indicating "area reservation failure" is sent from the cache management unit 38 in response to the area reservation request, the determination result of S66 is negative (NO), and the form interpreter 36-*f* terminates the process without registering the generated intermediate data of the form in the cache management unit 38 and the form cache 48.

An example of the processing procedure for the front-end device 30 according to the second exemplary modification has been described. The processing procedure for the back-end device 40 (particularly, the renderer 44) according to the second exemplary modification is similar to that in the exemplary embodiment described above (see FIGS. 7 and 8).

An exemplary embodiment and exemplary modifications of the present invention have been described. The exemplary embodiment and exemplary modifications described above are merely examples to help understand the present invention, and the scope of the present invention is not limited to the exemplary embodiment and exemplary modifications described above. For example, in the exemplary embodiment and exemplary modifications described above, the form cache 48 is provided in the back-end device 40; this is merely an example. The form cache 48 may be located in any place that is accessible from each of the interpreters 36 and the renderer 44. While in the exemplary embodiment and exemplary modifications described above, one renderer 44 is used, multiple renderers 44 may be used.

In another exemplary modification, the configuration controller 39 may switch the configuration of the front-end device 30 between the first configuration (see FIG. 3) including the form interpreter 36-*f* dedicated to interpretation of forms and the third configuration (see FIG. 12) that does not use the form cache 48. In this exemplary modification, the second configuration (see FIG. 9) that uses the logical page interpreter 36-*pb* (that performs both the interpretation of logical pages and the caching of forms) is not used. In this exemplary modification, if the number of interpreters 36 to start, which is determined by the number-of-interpreters-to-start determination unit 37, is less than or equal to a predetermined threshold value N, the front-end device 30 is implemented with the third configuration, and if the number of interpreters 36 to start is greater than the threshold value N, the front-end device 30 is implemented as the first configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to function as:
    a determination unit that determines an amount of hardware computational resources of the computer to determine the number of interpretation units capable of being implemented by the determined amount of hardware computational resources, and
    a controller that controls which of a first print data processing device and a second print data processing device the computer is caused to function as, in accordance with the number determined by the determination unit,
    the first print data processing device being a device configured to cause the computer to function as
        two or more first logical page interpretation units that interpret different logical pages in print data in parallel and that output interpretation results, and
        one caching interpretation unit that interprets an element to be cached which is included in each logical page in the print data and that stores interpretation results in a cache unit,
        upon detecting from the print data an element to be cached for which an interpretation result has not been stored in the cache unit, the caching interpretation unit interpreting the detected element to be cached and storing the interpretation result in the cache unit in association with cache identification information generated from data of the element to be cached in accordance with a predetermined generation rule,
        each of the two or more first logical page interpretation units generating, for an element to be cached which is included in a logical page being processed, a cache reference command including cache identification information generated from data of the element to be cached in accordance with the generation rule, instead of interpreting the element to be cached, and incorporating the generated cache reference command in an interpretation result of the logical page as an interpretation result of the element to be cached,
    the second print data processing device being a device configured to cause the computer to function as
        a second logical page interpretation unit that interprets each logical page of the print data and that outputs interpretation results,
        the second logical page interpretation unit interpreting, for an element to be cached in the logical page for which an interpretation result has not been stored in the cache unit, the element to be cached, and storing an interpretation result in the cache unit in association with cache identification information generated from data of the element to be cached in accordance with the generation rule,
        the second logical page interpretation unit generating, for an element to be cached in the logical page for which an interpretation result has been stored in the cache unit, a cache reference command including cache identification information generated from data of the element to be cached in accordance with the generation rule, instead of interpreting the element to be cached, and incorporating the generated cache reference command in an interpretation result of the logical page as an interpretation result of the element to be cached,
    the first print data processing device and the second print data processing device supplying the interpretation results of the respective logical pages of the print data, which are obtained by the first logical page interpretation units or the second logical page interpretation unit, to a print image data generation device,
    the print image data generation device being a device that processes the interpretation results of the respective logical pages, which are supplied from the first print data processing device or the second print data processing device, to generate print image data for the respective logical pages, upon detecting the cache reference command in the interpretation results of the logical pages, the print image data generation device acquiring an interpretation result corresponding to the cache identification information included in the cache reference command from the cache unit, generating print image data of an element to be cached corresponding to the cache identification information using the acquired interpreted interpretation result, and combining the print image data with the print image data of the logical pages.

2. The non-transitory computer readable medium according to claim 1, wherein the controller causes the computer to function as the second print data processing device if the number determined by the determination unit is greater than or equal to 1 and is less than N (N is a predetermined integer more than one), and causes the computer to function as the first print data processing device if the number determined by the determination unit is greater than or equal to N.

3. The non-transitory computer readable medium according to claim 2, wherein the controller controls which of the first print data processing device, the second print data processing device, and a third print data processing device the computer is caused to function as, in accordance with a determination result of the resource amount determination unit, wherein the third print data processing device is a device configured to cause the computer to function as two or more third logical page interpretation units that interpret different logical pages in the print data in parallel and that output interpretation results, in a case where a logical page being processed includes an element to be cached, the two or more third logical page interpretation units also interpreting the element to be cached and incorporating an interpretation result in an interpretation result of the logical page, and wherein the controller causes the computer to function as the second print data processing device if the number determined by the determination unit is equal to 1, and causes the computer to function as the third print data processing device if the number determined by the determination unit is greater than or equal to 2 and is less than the N.

4. The non-transitory computer readable medium according to claim 1, wherein each of the two or more first logical page interpretation units has a first operation mode and a second operation mode, wherein in the first operation mode, each of the two or more first logical page interpretation units generates, for an element to be cached which is included in the logical page being processed, a cache reference command including cache identification information generated from data of the element to be cached in accordance with the generation rule, instead of interpreting the element to be cached, and incorporates the generated cache reference command in the interpretation result of the logical page as an interpretation result of the element to be cached, wherein in the second operation mode, each of the two or more first logical page interpretation units performs, for an element to be cached which is included in the logical page being processed, query communication to query whether or not an interpretation result of the element to be cached has been stored in the cache unit, in a case where it is determined as a result of the query communication that the interpretation result of the element to be cached has been stored in the cache unit, each of the two or more first logical page interpretation units generates a cache reference command including cache identification information generated from data of the element to be cached in accordance with the generation rule, and incorporates the generated cache reference command in the interpretation result of the logical page as an interpretation result of the element to be cached, and in a case where it is determined as a result of the query communication that the interpretation result of the element to be cached has not been stored in the cache unit, each of the two or more first logical page interpretation units interprets the element to be cached, and incorporates an interpretation result in the interpretation result of the logical page, and wherein the program further causes the computer to function as a mode controller that performs control to switch an operation mode of the two or more first logical page interpretation units between the first mode and the second mode.

5. The non-transitory computer readable medium according to claim 4, wherein the mode controller causes the two or more first logical page interpretation units to operate in the second operation mode until interpretation of a predetermined number of initial pages in the print data has been completed by the two or more first logical page interpretation units, and switches the operation mode of the two or more first logical page interpretation units to the first operation mode when interpretation of the predetermined number of initial pages in the print data is completed by the two or more first logical page interpretation units.

6. The non-transitory computer readable medium according to claim 4, wherein the mode controller monitors an available capacity of the cache unit, and switches the operation mode of the two or more first logical page interpretation units to the second operation mode in a case where the available capacity of the cache unit is lower than a predetermined threshold value while the two or more first logical page interpretation units are operating in the first operation mode.

7. The non-transitory computer readable medium according to claim 5, wherein the mode controller monitors an available capacity of the cache unit, and switches the operation mode of the two or more first logical page interpretation units to the second operation mode in a case where the available capacity of the cache unit is lower than a predetermined threshold value while the two or more first logical page interpretation units are operating in the first operation mode.

8. The non-transitory computer readable medium according to claim 4, wherein the computer is further caused to function as a batch deletion unit that monitors a hit ratio of the cache unit and a state of use of intermediate data of each element to be cached which is stored in the cache unit, the hit ratio of the cache unit representing the ratio of an interpretation result of an element to be cached which is related to the query communication performed by the two or more first logical page interpretation units and which is stored in the cache unit to the query communication, that specifies a group of elements to be cached for which recent frequency of use of intermediate data is lower than a predetermined threshold value in accordance with the state of use in a case where the hit ratio is lower than a predetermined determination threshold value while the two or more first logical page interpretation units are operating in the second operation mode, and that deletes intermediate data of the specified group of elements to be cached in a batch from the cache unit.

9. The non-transitory computer readable medium according to claim 5, wherein the computer is further caused to function as a batch deletion unit that monitors a hit ratio of the cache unit and a state of use of intermediate data of each element to be cached which is stored in the cache unit, the hit ratio of the cache unit representing the ratio of an interpretation result of an element to be cached which is related to the query communication performed by the two or more first logical page interpretation units and which is stored in the cache unit to the query communication, that specifies a group of elements to be cached for which recent frequency of use of intermediate data is lower than a predetermined threshold value in accordance with the state of use in a case where the hit ratio is lower than a predetermined determination threshold value while the two or more first logical page interpretation units are operating in the second operation mode, and that deletes intermediate data of the specified group of elements to be cached in a batch from the cache unit.

10. The non-transitory computer readable medium according to claim 6, wherein the computer is further caused to function as a batch deletion unit that monitors a hit ratio of the cache unit and a state of use of intermediate data of each element to be cached which is stored in the cache unit, the hit ratio of the cache unit representing the ratio of an interpretation result of an element to be cached which is related to the query communication performed by the two or more first logical page interpretation units and which is stored in the cache unit to the query communication, that specifies a group of elements to be cached for which recent frequency of use of intermediate data is lower than a predetermined threshold value in accordance with the state of use in a case where the hit ratio is lower than a predetermined determination threshold value while the two or more first logical page interpretation units are operating in the second operation mode, and that deletes intermediate data of the specified group of elements to be cached in a batch from the cache unit.

11. The non-transitory computer readable medium according to claim 7, wherein the computer is further caused to function as a batch deletion unit that monitors a hit ratio of the cache unit and a state of use of intermediate data of each element to be cached which is stored in the cache unit, the hit ratio of the cache unit representing the ratio of an interpretation result of an element to be cached which is related to the query communication performed by the two or more first logical page interpretation units and which is stored in the cache unit to the query communication, that specifies a group of elements to be cached for which recent frequency of use of intermediate data is lower than a predetermined threshold value in accordance with the state of use in a case where the hit ratio is lower than a predetermined determination threshold value while the two or more first logical page interpretation units are operating in the second operation mode, and that deletes intermediate data of the specified group of elements to be cached in a batch from the cache unit.

12. The non-transitory computer readable medium according to claim 8, wherein the mode controller switches the operation mode of the two or more first logical page interpretation units from the second operation mode to the first operation mode in accordance with deletion performed by the batch deletion unit.

13. The non-transitory computer readable medium according to claim 9, wherein the mode controller switches the operation mode of the two or more first logical page interpretation units from the second operation mode to the first operation mode in accordance with deletion performed by the batch deletion unit.

14. The non-transitory computer readable medium according to claim 10, wherein the mode controller switches the operation mode of the two or more first logical page interpretation units from the second operation mode to the first operation mode in accordance with deletion performed by the batch deletion unit.

15. The non-transitory computer readable medium according to claim 11, wherein the mode controller switches the operation mode of the two or more first logical page interpretation units from the second operation mode to the first operation mode in accordance with deletion performed by the batch deletion unit.

16. A non-transitory computer readable medium storing a program causing a computer to function as:
a determination unit that determines an amount of hardware computational resources of the computer to determine the number of interpretation units capable of being implemented by the determined amount of hardware computational resources, and
a controller that controls which of a first print data processing device and a second print data processing device the computer is caused to function as, in accordance with the number determined by the determination unit,
the first print data processing device being a device configured to cause the computer to function as
two or more first logical page interpretation units that interpret different logical pages in print data in parallel and that output interpretation results, and
one caching interpretation unit that interprets an element to be cached which is included in each logical page in the print data and that stores interpretation results in a cache unit,
upon detecting from the print data an element to be cached for which an interpretation result has not been stored in the cache unit, the caching interpretation unit interpreting the detected element to be cached and storing the interpretation result in the cache unit in association with cache identification information generated from data of the element to be cached in accordance with a predetermined generation rule,
each of the two or more first logical page interpretation units generating, for an element to be cached which is included in a logical page being processed, a cache reference command including cache identification information generated from data of the element to be cached in accordance with the generation rule, instead of interpreting the element to be cached, and incorporating the generated cache reference command in an interpretation result of the logical page as an interpretation result of the element to be cached,
the second print data processing device being a device configured to cause the computer to function as
two or more second logical page interpretation units that interpret different logical pages in the print data in parallel and that output interpretation results,
in a case where a logical page being processed includes an element to be cached, the two or more second logical page interpretation units also interpreting the element to be cached and incorporating an interpretation result in an interpretation result of the logical page,
the first print data processing device and the second print data processing device supplying the interpretation results of the respective logical pages of the print data, which are obtained by the first logical page interpretation units or the second logical page interpretation unit, to a print image data generation device, the print image data generation device being a device that processes the interpretation results of the respective logical pages, which are supplied from the first print data processing device or the second print data processing device, to generate print image data for the respective logical pages, upon detecting the cache reference command in the interpretation results of the logical pages, the print image data generation device acquiring an interpretation result corresponding to the cache identification information included in the cache reference command from the cache unit, generating print image data of an element to be cached corresponding to the cache identification information using the acquired interpreted interpretation result, and combining the print image data with the print image data of the logical pages.

17. The non-transitory computer readable medium according to claim 16, wherein the controller causes the computer to function as the second print data processing device if the number determined by the determination unit is less than N (N is a predetermined integer more than one), and causes the computer to function as the first print data processing device if the number determined by the determination unit is greater than or equal to N.

* * * * *